(12) United States Patent
Kawakami et al.

(10) Patent No.: US 9,768,443 B2
(45) Date of Patent: *Sep. 19, 2017

(54) POSITIVE ELECTRODE FOR NONAQUEOUS SECONDARY BATTERY, METHOD FOR FORMING THE SAME, NONAQUEOUS SECONDARY BATTERY, AND ELECTRICAL DEVICE

(71) Applicant: SEMICONDUCTOR ENERGY LABORATORY CO., LTD., Atsugi-shi, Kanagawa-ken (JP)

(72) Inventors: Takahiro Kawakami, Kanagawa (JP); Masaki Yamakaji, Kanagawa (JP); Mako Motoyoshi, Kanagawa (JP); Rika Yatabe, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 250 days.

This patent is subject to a terminal disclaimer.

(21) Appl. No.: 14/070,636

(22) Filed: Nov. 4, 2013

(65) Prior Publication Data
US 2014/0127568 A1    May 8, 2014

(30) Foreign Application Priority Data
Nov. 7, 2012    (JP) .................................. 2012-245467

(51) Int. Cl.
*H01M 4/1393*    (2010.01)
*H01M 4/131*    (2010.01)
(Continued)

(52) U.S. Cl.
CPC ......... *H01M 4/1393* (2013.01); *H01M 4/131* (2013.01); *H01M 4/133* (2013.01);
(Continued)

(58) Field of Classification Search
CPC .. H01M 4/1939; H01M 4/133; H01M 4/1391; H01M 4/364; H01M 4/625
See application file for complete search history.

(56) References Cited

U.S. PATENT DOCUMENTS

| 4,302,518 A | 11/1981 | Goodenough et al. |
| 4,668,595 A | 5/1987 | Yoshino et al. |

(Continued)

FOREIGN PATENT DOCUMENTS

| CN | 101562248 A | 10/2009 |
| CN | 101562248 B1 | 5/2011 |

(Continued)

OTHER PUBLICATIONS

Wang.L et al., "A facile method of preparing mixed conducting LiFePO4/graphene composites for lithium-ion batteries", Solid State Ionics, Oct. 28, 2010, vol. 181, pp. 1685-1689, Elsevier.

(Continued)

*Primary Examiner* — Helen O Conley
(74) *Attorney, Agent, or Firm* — Nixon Peabody LLP; Jeffrey L. Costellia

(57) ABSTRACT

A positive electrode for a nonaqueous secondary battery including an active material layer which has sufficient electron conductivity with a low ratio of a conductive additive is provided. A positive electrode for a nonaqueous secondary battery including an active material layer which is highly filled with an active material, id est, including the active material and a low ratio of a conductive additive. The active material layer includes a plurality of particles of an active material with a layered rock salt structure, graphene that is in surface contact with the plurality of particles of the active material, and a binder.

20 Claims, 18 Drawing Sheets

(51) Int. Cl.
*H01M 4/133* (2010.01)
*H01M 4/1391* (2010.01)
*H01M 4/36* (2006.01)
*H01M 4/62* (2006.01)

(52) U.S. Cl.
CPC ......... *H01M 4/1391* (2013.01); *H01M 4/364* (2013.01); *H01M 4/625* (2013.01); *Y02E 60/122* (2013.01)

(56) References Cited

U.S. PATENT DOCUMENTS

| | | |
|---|---|---|
| 5,783,333 A | 7/1998 | Mayer et al. |
| 5,871,866 A | 2/1999 | Barker et al. |
| 5,910,382 A | 6/1999 | Goodenough et al. |
| 6,085,015 A | 7/2000 | Armand et al. |
| 6,514,640 B1 | 2/2003 | Armand et al. |
| 7,179,561 B2 | 2/2007 | Niu et al. |
| 7,572,542 B2 | 8/2009 | Naoi |
| 7,658,901 B2 | 2/2010 | Prud'Homme et al. |
| 7,745,047 B2 | 6/2010 | Zhamu et al. |
| 7,842,432 B2 | 11/2010 | Niu et al. |
| 7,939,218 B2 | 5/2011 | Niu |
| 7,977,007 B2 | 7/2011 | Niu et al. |
| 7,977,013 B2 | 7/2011 | Niu et al. |
| 8,278,011 B2 | 10/2012 | Zhu et al. |
| 8,317,984 B2 | 11/2012 | Gilje |
| 8,652,687 B2 | 2/2014 | Zhamu et al. |
| 8,802,295 B2 | 8/2014 | Nesper et al. |
| 8,883,351 B2 | 11/2014 | Todoriki et al. |
| 8,945,772 B2 | 2/2015 | Kawakami et al. |
| 9,337,481 B2 | 5/2016 | Nesper et al. |
| 9,490,474 B2 | 11/2016 | Nomoto et al. |
| 2001/0010807 A1 | 8/2001 | Matsubara et al. |
| 2002/0102459 A1 | 8/2002 | Hosoya et al. |
| 2002/0195591 A1 | 12/2002 | Ravet et al. |
| 2004/0043294 A1 | 3/2004 | Fukui et al. |
| 2006/0051671 A1 | 3/2006 | Thackeray et al. |
| 2007/0009799 A1 | 1/2007 | Zheng |
| 2007/0131915 A1 | 6/2007 | Stankovich et al. |
| 2008/0048153 A1 | 2/2008 | Naoi |
| 2008/0254296 A1 | 10/2008 | Handa et al. |
| 2009/0110627 A1 | 4/2009 | Choi et al. |
| 2009/0117467 A1 | 5/2009 | Zhamu et al. |
| 2009/0123850 A1 | 5/2009 | Takeuchi et al. |
| 2009/0253045 A1 | 10/2009 | Kotato et al. |
| 2009/0305135 A1 | 12/2009 | Shi et al. |
| 2010/0035093 A1 | 2/2010 | Ruoff et al. |
| 2010/0055025 A1 | 3/2010 | Jang et al. |
| 2010/0081057 A1 | 4/2010 | Liu et al. |
| 2010/0105834 A1 | 4/2010 | Tour et al. |
| 2010/0143798 A1 | 6/2010 | Zhamu et al. |
| 2010/0176337 A1 | 7/2010 | Zhamu et al. |
| 2010/0233538 A1 | 9/2010 | Nesper et al. |
| 2010/0233546 A1 | 9/2010 | Nesper et al. |
| 2010/0248034 A1 | 9/2010 | Oki et al. |
| 2010/0301279 A1 | 12/2010 | Nesper et al. |
| 2010/0303706 A1 | 12/2010 | Wallace et al. |
| 2010/0308277 A1 | 12/2010 | Grupp |
| 2010/0330421 A1 | 12/2010 | Cui et al. |
| 2011/0012067 A1 | 1/2011 | Kay |
| 2011/0111294 A1 | 5/2011 | Lopez et al. |
| 2011/0111303 A1 | 5/2011 | Kung et al. |
| 2011/0121240 A1 | 5/2011 | Amine et al. |
| 2011/0136019 A1 | 6/2011 | Amiruddin et al. |
| 2011/0159372 A1 | 6/2011 | Zhamu et al. |
| 2011/0171371 A1* | 7/2011 | Li .................... B82Y 30/00 427/122 |
| 2011/0227000 A1 | 9/2011 | Ruoff et al. |
| 2011/0229795 A1 | 9/2011 | Niu et al. |
| 2011/0292570 A1 | 12/2011 | Ivanovici et al. |
| 2011/0305949 A1* | 12/2011 | Nesper ............... H01M 4/5825 429/211 |
| 2012/0021273 A1 | 1/2012 | Ohmori et al. |
| 2012/0045692 A1 | 2/2012 | Takemura et al. |
| 2012/0058397 A1 | 3/2012 | Zhamu et al. |
| 2012/0064409 A1 | 3/2012 | Zhamu et al. |
| 2012/0088151 A1 | 4/2012 | Yamazaki et al. |
| 2012/0088156 A1 | 4/2012 | Nomoto et al. |
| 2012/0100402 A1 | 4/2012 | Nesper et al. |
| 2012/0217452 A1* | 8/2012 | Park ........................ H01B 1/08 252/506 |
| 2012/0308884 A1 | 12/2012 | Oguni et al. |
| 2012/0308891 A1 | 12/2012 | Todoriki et al. |
| 2012/0308896 A1* | 12/2012 | Asari ................. H01M 4/5825 429/231.95 |
| 2012/0315550 A1 | 12/2012 | Liu et al. |
| 2012/0321953 A1 | 12/2012 | Chen et al. |
| 2013/0084384 A1 | 4/2013 | Yamakaji et al. |
| 2013/0089790 A1* | 4/2013 | Byon ..................... H01G 11/36 429/231.8 |
| 2013/0156942 A1 | 6/2013 | Yamakaji et al. |
| 2013/0164619 A1 | 6/2013 | Yamakaji et al. |
| 2013/0266859 A1 | 10/2013 | Todoriki et al. |
| 2013/0266869 A1 | 10/2013 | Todoriki et al. |
| 2015/0140429 A1 | 5/2015 | Kawakami et al. |
| 2017/0054141 A1 | 2/2017 | Nomoto et al. |

FOREIGN PATENT DOCUMENTS

| | | |
|---|---|---|
| EP | 2698854 A | 2/2014 |
| JP | H08-37007 A | 2/1996 |
| JP | 2002-110162 A | 4/2002 |
| JP | 2003-238131 A | 8/2003 |
| JP | 2011-048992 A1 | 3/2011 |
| JP | 2011-105569 A1 | 6/2011 |
| JP | 2012-094516 A | 5/2012 |
| JP | 2012-099467 A | 5/2012 |
| JP | 2013-030463 A | 2/2013 |
| WO | WO-2006/071076 A1 | 7/2006 |
| WO | WO-2011/026581 | 3/2011 |
| WO | WO-2011/079238 | 6/2011 |
| WO | WO-2011/141486 A1 | 11/2011 |
| WO | WO-2012/165358 | 12/2012 |

OTHER PUBLICATIONS

R. Sundaram et al., "Electrochemical Modification of Graphene", Adv. Mater., 2008, vol. 20, Issue 16, pp. 3050-3053.

C. Mattevi et al., "Evolution of Electrical, Chemical, and Structural Properties of Transparent and Conducting Chemically Derived Graphene Thin Films", Adv. Funct. Mater., 2009, vol. 19, Issue 16, pp. 2577-2583.

H. Zhang et al., "Vacuum-assisted synthesis of graphene from thermal exfoliation and reduction of graphite oxide", J. Mater. Chem., 2011, vol. 21, Issue 14, pp. 5392-5397.

M. Zhou et al., "Controlled Synthesis of Large-Area and Patterned Electrochemically Reduced Graphene Oxide Films", Chem. Eur. J., 2009, vol. 15, Issue 25, pp. 6116-6120.

Z. Wang et al., "Direct Electrochemical Reduction of Single-Layer Graphene Oxide and Subsequent Functionalizaiton with Glucose Oxidase", J. Phys. Chem. C, 2009, vol. 113, No. 32, pp. 14071-14075.

Y. Shao et al., "Facile and controllable electrochemical reduction of graphene oxide and its applications", J. Mater. Chem., 2010, vol. 20, Issue 1, pp. 743-748.

Padhi.A et al., "Phospho-olivines as Positive-Electrode Materials for Rechargeable Lithium Batteries", *J. Electrochem. Soc.*, 1997, vol. 144, No. 4, pp. 1188-1194.

Zhou.X et al., "Graphene modified LiFePO4 cathode materials for high power lithium ion batteries", *J. Mater. Chem.*, 2011, vol. 21, pp. 3353-3358.

Paek.S et al., "Enhanced Cyclic Performance and Lithium Storage Capacity of SnO2/Graphene Nanoporous Electrodes with Three-Dimensionally Delaminated Flexible Structure", *NANO Letters*, 2009, vol. 9, No. 1, pp 72-75.

Wang.G et al., "Sn/graphene nanocomposite with 3D architecture for enhanced reversible lithium storage in lithium ion batteries", *J. Mater. Chem.*, 2009, vol. 19, No. 44, pp. 8378-8384.

(56) References Cited

OTHER PUBLICATIONS

Wang.D et al., "Self-Assembled TiO2-Graphene Hybrid Nanostructures for Enhanced Li-Ion Insertion", *ACS Nano*, 2009, vol. 3, No. 4, pp. 907-914.
Su.F et al., "Flexible and planar graphene conductive additives for lithium-ion batteries", *J. Mater. Chem.*, 2010, vol. 20, Issue 43, pp. 9644-9650.
Yu.G et al., "Solution-Processed Graphene/MnO2 Nanostructured Textiles for High-Performance Electrochemical Capacitors", *NANO Letters*, 2011, vol. 11, No. 7, pp. 2905-2911.
Todoriki.H et al., "High performance lithium ion battery using Graphene Net electrode", *222nd ECS Meeting Abstract*, 2012, p. 1014.
Park.S et al., "Hydrazine-reduction of graphite-and graphene oxide", *Carbon*, 2011, vol. 49, Issue 9, pp. 3019-3023.
Dreyer.D et al., "The chemistry of graphene oxide", *Chem. Soc. Rev.*, 2010, vol. 39, Issue 1, pp. 228-240.
Y. Shao et al., "Facile and controllable electrochemical reduction of graphene oxide and its applications", J. Mater. Chem., 2010, vol. 20, Issue 4, pp. 743-748.
Ju.J et al., "Electrochemical performance of Li[Co0.1Ni0.15Li0.2Mn0.55]O2 modified by carbons as cathode materials", Electrochimica Acta, 2011, vol. 56, pp. 8791-8796.

\* cited by examiner

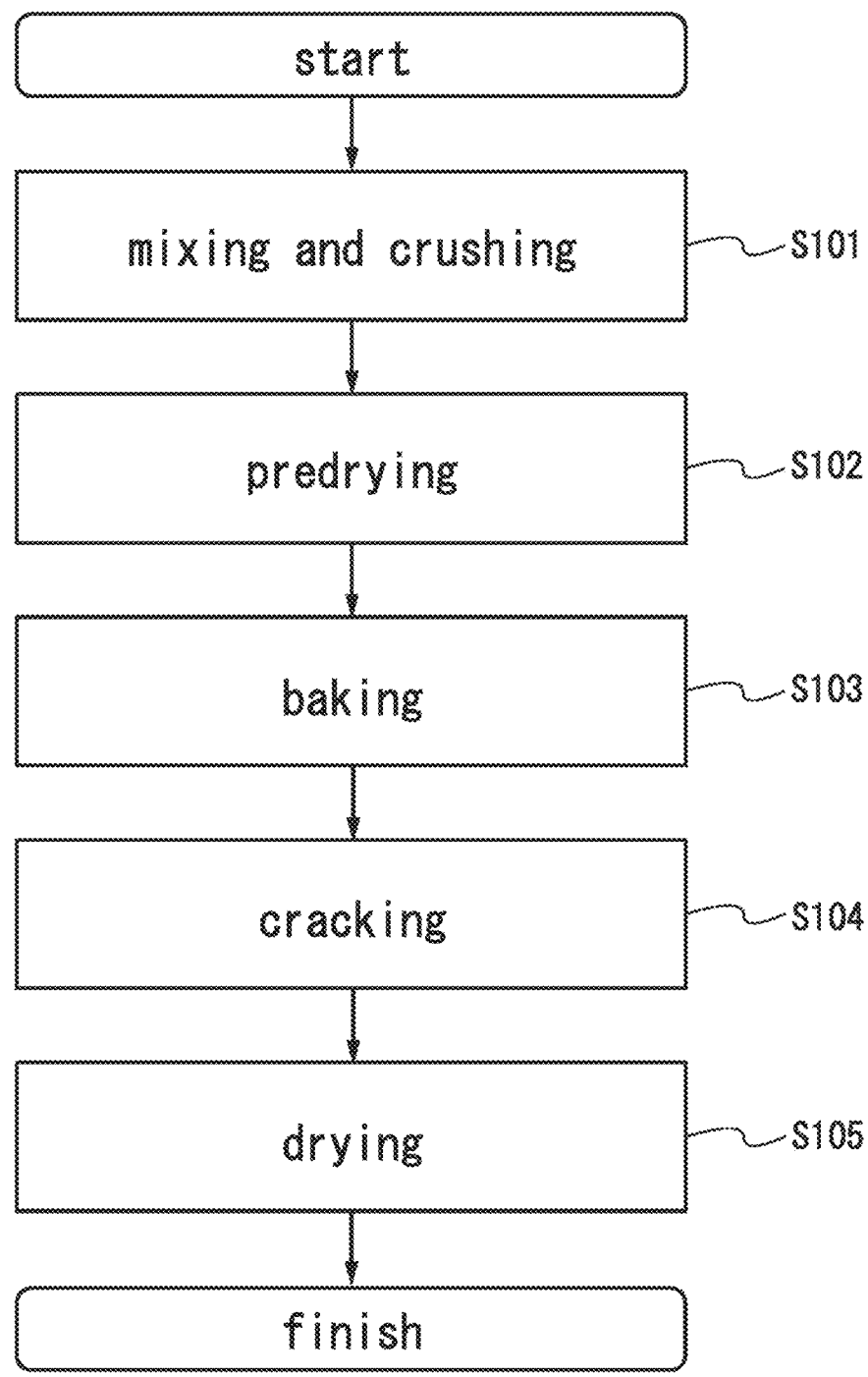

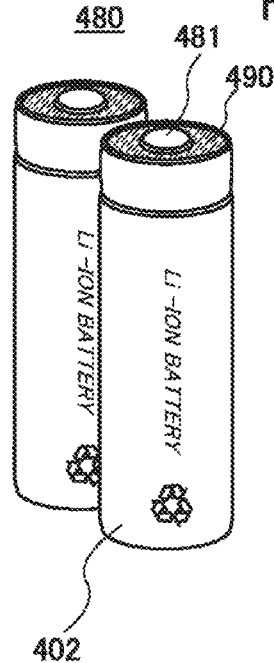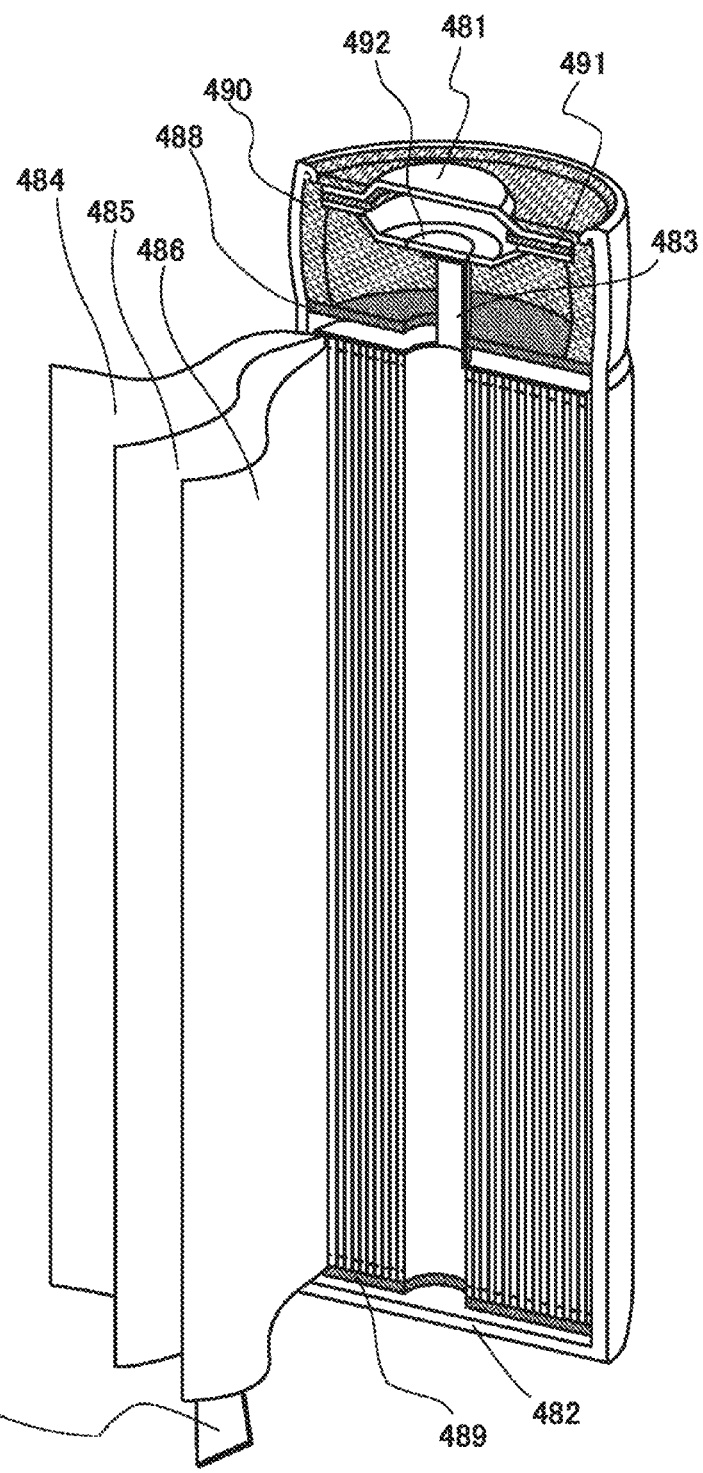
FIG. 8A
FIG. 8B

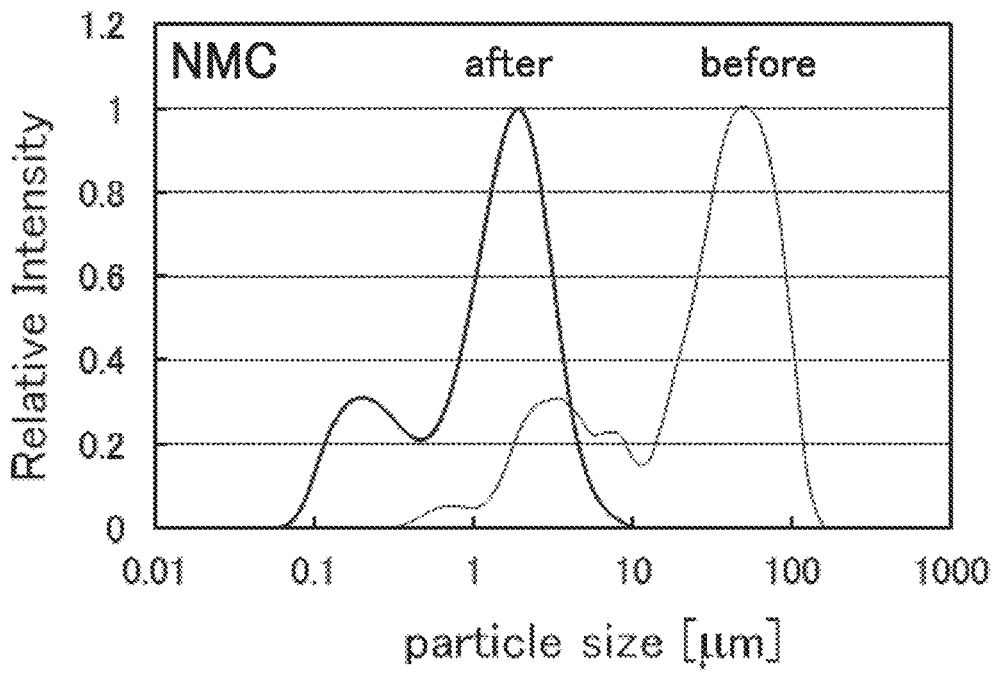
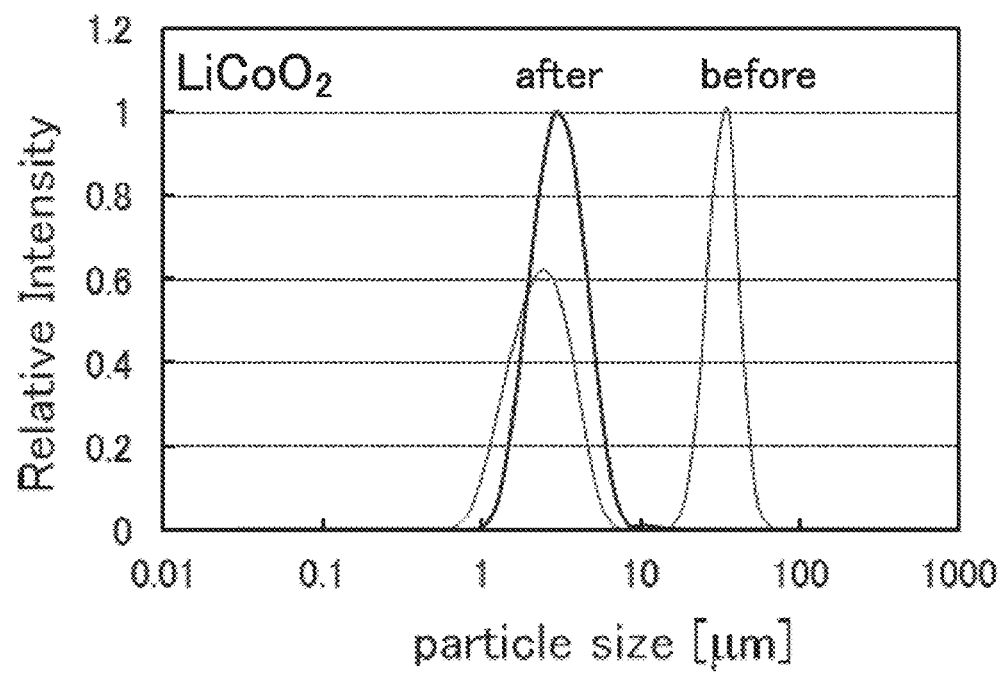

POSITIVE ELECTRODE FOR NONAQUEOUS SECONDARY BATTERY, METHOD FOR FORMING THE SAME, NONAQUEOUS SECONDARY BATTERY, AND ELECTRICAL DEVICE

BACKGROUND OF THE INVENTION

1. Field of the Invention

The present invention relates to a positive electrode for a nonaqueous secondary battery and a method for forming the positive electrode. Further, the present invention relates to a nonaqueous secondary battery and an electrical device including the nonaqueous secondary battery.

2. Description of the Related Art

In recent years, a variety of power storage devices, for example, secondary batteries such as lithium-ion secondary batteries, lithium-ion capacitors, and air cells have been actively developed. In particular, demand for lithium-ion secondary batteries with high output and high energy density has rapidly grown with the development of the semiconductor industry, for electrical devices, for example, portable information terminals such as mobile phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

A lithium-ion secondary battery, which is one of nonaqueous secondary batteries and widely used due to its high energy density, includes a positive electrode including an active material such as lithium cobalt oxide ($LiCoO_2$) or lithium iron phosphate ($LiFePO_4$), a negative electrode formed of a carbon material such as graphite capable of occlusion and release of lithium ions, a nonaqueous electrolyte solution in which an electrolyte formed of a lithium salt such as $LiBF_4$ or $LiPF_6$ is dissolved in an organic solvent such as ethylene carbonate or diethyl carbonate, and the like. A lithium-ion secondary battery are charged and discharged in such a way that lithium ions in the secondary battery move between the positive electrode and the negative electrode through the nonaqueous electrolyte solution and inserted into or extracted from the active materials of the positive electrode and the negative electrode.

A binder is mixed into the positive electrode or the negative electrode in order that the active materials can be bound or the active material and a current collector can be bound. Since the binder is generally an organic high molecular compound such as polyvinylidene fluoride (PVdF) which has an insulating property, the binder has extremely low electron conductivity.

Hence, by mixing a conductive additive such as acetylene black (AB) or graphite particles, the electron conductivity between the active materials or between the active material and the current collector can be improved. Thus, a positive electrode active material with high electron conductivity can be provided (see Patent Document 1).

REFERENCE

[Patent Document 1] Japanese Published Patent Application No. 2002-110162

SUMMARY OF THE INVENTION

However, acetylene black used as a conductive additive has an average particle diameter of several tens of nanometers to several hundreds of nanometers and is a high volume particle; thus, contact with an active material easily becomes point contact. Consequently, contact resistance between the active material and the conductive additive is high. Further, if the weight ratio of the conductive additive to the active material layer is increased so as to increase contact points between the active material and the conductive additive, the weight ratio of the active material to the active material layer decreases, resulting in the lower discharge capacity of the battery.

In the case where graphite particles are used as the conductive additive, natural graphite is generally used in consideration of cost. In such a case, iron, lead, copper, or the like contained as an impurity in a graphite particle reacts with the active material or the current collector, which might reduce the voltage or capacity of the battery.

Further, as particles of the active material become minuter, cohesion between the particles becomes stronger, which makes uniform dispersion in the binder or the conductive additive difficult. Consequently, a portion where active material particles are aggregated and densely present and a portion where active material particles are not aggregated and thinly present are locally generated. In the portion where active material particles are aggregated and the ratio of the conductive additive is low, the active material particles do not contribute to formation of the discharge capacity of the battery.

In view of the above problems, an object of one embodiment of the present invention is to provide a positive electrode for a nonaqueous secondary battery including an active material layer having sufficient electron conductivity with a low ratio of a conductive additive. Another object is to provide a positive electrode for a nonaqueous secondary battery including an active material layer which is highly filled with an active material and includes the active material at high density with a low ratio of a conductive additive. Another object is to provide a nonaqueous secondary battery having high capacity per electrode volume by using the positive electrode for a nonaqueous secondary battery.

One embodiment of the present invention can achieve at least one of the objects set forth above.

In view of the above objects, one embodiment of the present invention is a positive electrode for a nonaqueous secondary battery including a current collector and an active material layer over the current collector. The active material layer includes a plurality of particles of an active material with a layered rock salt structure, graphene that is in surface contact with the plurality of particles of the active material, and a binder.

Another embodiment of the present invention is a method for forming a positive electrode for a nonaqueous secondary battery, including the steps of dispersing graphene oxide into a dispersion medium including a polar solvent, forming a mixture by mixing an active material having a layered rock salt structure with the dispersion medium in which the graphene oxide is dispersed, forming a paste by mixing a binder with the mixture, applying the paste to a current collector, and forming the active material including graphene over the current collector by reducing the graphene oxide after or at the same time as volatilization of the dispersion medium included in the applied paste.

A positive electrode for a nonaqueous secondary battery including an active material layer having sufficient electron conductivity with a low ratio of a conductive additive is provided. A positive electrode for a nonaqueous secondary battery including an active material layer which is highly filled with an active material, id est including the active material and a low ratio of a conductive additive is provided. With the use of the positive electrode for a nonaqueous secondary battery, a nonaqueous secondary battery having high capacity per electrode volume is provided.

BRIEF DESCRIPTION OF THE DRAWINGS

FIG. 3 is a flow chart illustrating a method for forming an active material.
FIGS. 8A and 8B illustrate a nonaqueous secondary battery.
FIGS. 18A and 18B are graphs each showing particle size distribution before and after cracking.

DETAILED DESCRIPTION OF THE INVENTION

Figure 1A:
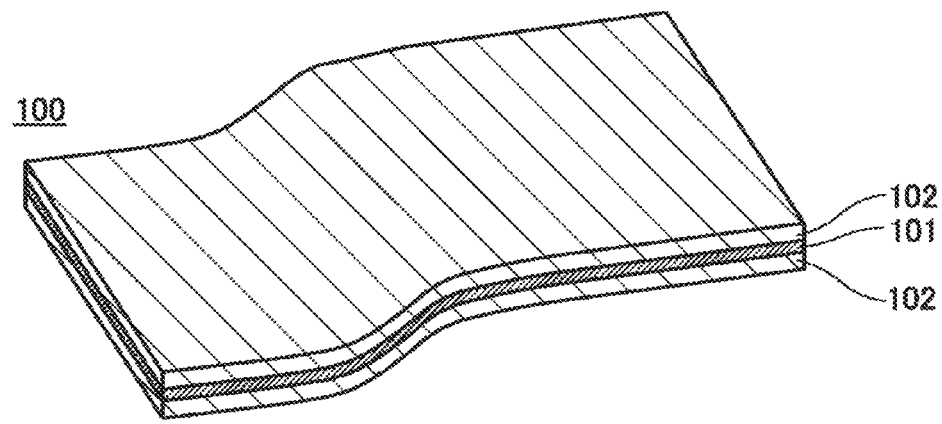
FIGS. 1A and 1B illustrate a positive electrode.

Embodiments and examples of the present invention are described below in detail with reference to the drawings. Note that the present invention is not limited to the description in the embodiments and the examples, and it is easily understood by those skilled in the art that modes and details of the present invention can be modified in various ways. Therefore, the invention should not be construed as being limited to the description in the following embodiments and examples.

Note that in drawings used in this specification, the thicknesses of films, layers, and substrates and the sizes of components (e.g., the sizes of regions) are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. In addition, the ordinal numbers in this specification and the like do not denote particular names which specify the present invention.

Note that in structures of the present invention described in this specification and the like, the same portions or portions having similar functions are denoted by the same reference numerals in different drawings, and descriptions thereof are not repeated. In addition, the same hatching pattern is applied to portions having similar functions, and the portions are not especially denoted by reference numerals in some cases.

Note that in this specification and the like, a positive electrode and a negative electrode for a secondary battery may be collectively referred to as an electrode; the electrode in this case refers to at least one of the positive electrode and the negative electrode.

Note that in this specification and the like, a charging rate C refers to the rate at which a secondary battery is charged. For example, the charging rate in the case of charging a battery having a capacity of 1 Ah with 1 A is 1 C. In addition, a discharging rate C refers to the rate at which a secondary battery is discharged. For example, the discharging rate in the case of discharging a battery having a capacity of 1 Ah with 1 A is 1 C.

1. Structure of Positive Electrode for Nonaqueous Secondary Battery

Figure 1B:
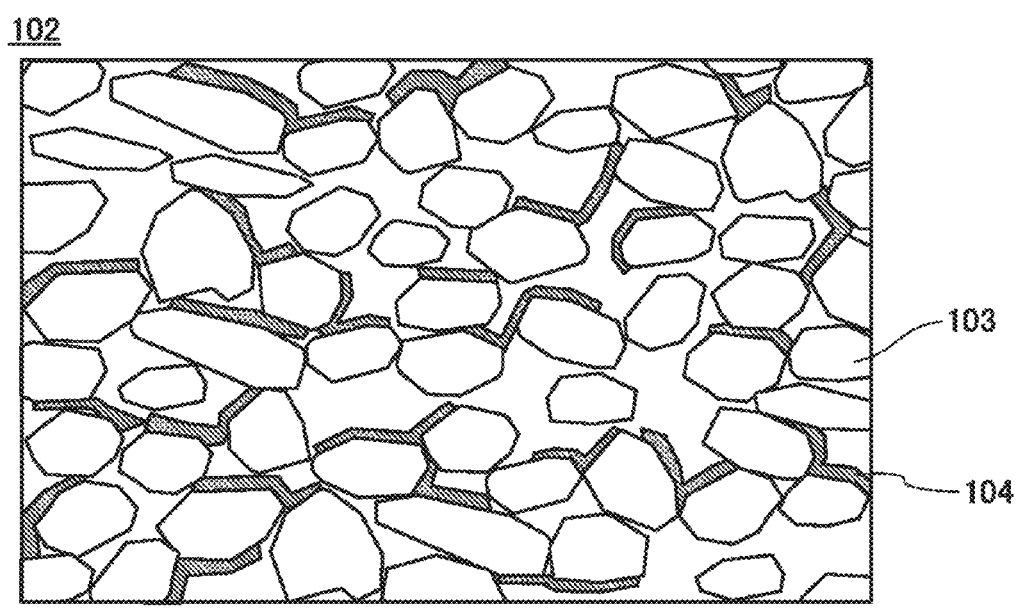

In this section, a positive electrode for a nonaqueous secondary battery of one embodiment of the present invention is described with reference to FIGS. 1A and 1B and FIGS. 2A and 2B. FIG. 1A is a perspective view of a positive electrode. FIG. 1B is a longitudinal cross-sectional view of a positive electrode active material layer.

In a positive electrode 100 illustrated in FIG. 1A, an active material layer 102 is provided on both surfaces of a current collector 101 that is a rectangular sheet (band).

1.1. Current Collector

Although the current collector 101 has a sheet-like shape in FIG. 1A, the shape of the current collector 101 is not limited thereto, and a given shape can be selected as appropriate. In addition, although the active material layer 102 is provided on the both surfaces of the current collector 101 in FIG. 1A, the active material layer 102 may be formed on one of the surfaces of the current collector 101. The active material layer 102 is not necessarily formed over the entire surface of the current collector 101 and a region that is not coated, such as a region for connection to a positive electrode tab, may be provided as appropriate.

The current collector 101 can be formed using a highly conductive material which is not alloyed with a carrier ion such as an lithium ion, for example, a metal typified by gold, platinum, zinc, iron, aluminum, or titanium, or an alloy of such a metal (e.g., stainless steel). Alternatively, the current collector 101 can be formed using an aluminum alloy to which an element which improves heat resistance, such as silicon, titanium, neodymium, scandium, or molybdenum, is added. The current collector 101 can have a foil-like shape, a plate-like shape (sheet-like shape), a net-like shape, a punching-metal shape, an expanded-metal shape, or the like as appropriate. The current collector 101 preferably has a thickness of greater than or equal to 10 μm and less than or equal to 30 μm.

1.2. Active Material Layer

FIG. 1B is a schematic view illustrating the longitudinal cross-sectional view of the active material layer 102. The active material layer 102 includes an active material 103 having a layered rock salt structure, graphene 104, and a binder (not illustrated).

1.2.1. Active Material with Layered Rock Salt Structure

A positive electrode active material for a nonaqueous secondary battery is a material into and from which carrier ions, such as lithium ions, can be inserted and extracted. From the beginning of the development of lithium-ion secondary batteries to present, lithium cobalt oxide (Li-$CoO_2$) has been widely used as such an active material. Lithium cobalt oxide has a layered rock salt structure.

1.2.1.1. Material for Active Material with Layered Rock Salt Structure

The layered rock salt structure is also referred to as an α-NaFeO$_2$ type structure, and is a crystal structure where an ion layer of a transition metal and a single layer of lithium are alternately stacked with an oxide ion provided therebetween. Since a diffusion path of lithium ions is two dimensional in the layered rock salt structure, the layered rock salt structure has conductivity and ionic conductivity higher than those of an olivine structure having a one-dimensional diffusion path. For this reason, lithium ions can be easily inserted and extracted in charging and discharging; thus, an active material with the layered rock salt structure is preferably used as a positive electrode active material of a lithium-ion secondary battery.

In addition to lithium cobalt oxide (LiCoO$_2$), examples of such an active material having the layered rock salt structure are LiNiO$_2$; LiMnO$_2$; Li$_2$MnO$_3$; an NiCo-based complex oxide (a general formula thereof is LiNi$_x$Co$_{1-x}$O$_2$ (0<x<1)) such as LiNi$_{0.8}$Co$_{0.2}$O$_2$; an NiMn-based complex oxide (a general formula thereof is LiNi$_x$Mn$_{1-x}$O$_2$ (0<x<1)) such as LiNi$_{0.5}$Mn$_{0.5}$O$_2$; and an NiMnCo-based complex oxide (also referred to as NMC, and a general formula thereof is LiNi$_x$Mn$_y$Co$_{1-x-y}$O$_2$ (x>0, y>0, x+y<1)) such as LiNi$_{1/3}$Mn$_{1/3}$Co$_{1/3}$O$_2$. In one embodiment of the present invention, any of such active materials having the layered rock salt structure can be widely used. Alternatively, a combination of any of such complex oxides may be used.

In the case where carrier ions are alkali metal ions other than lithium ions or alkaline-earth metal ions, the following may be used as the active material: a complex oxide which is obtained by substituting an alkali metal (e.g., sodium or potassium) or an alkaline-earth metal (e.g., calcium, strontium, barium, beryllium, or magnesium) for lithium in any of the complex oxides.

1.2.1.2. Shape of Active Material with Layered Rock Salt Structure

The active material 103 is baked particles obtained by mixing raw materials in a predetermined ratio and baking the mixture. The active material 103 may be secondary particles obtained through crushing, granulation, and sizing of the baked particles by an appropriate means. These particles have an average diameter and particle size distribution. Here, "particles" are used to indicate the exterior shape of an active material having a given surface area, such as a spherical shape (powder shape), a plate shape, a horn shape, a columnar shape, a needle shape, or a flake shape. The particles of the active material are not necessarily in spherical shapes and may have given shapes different from each other. Although the particles of the active material 103 are schematically illustrated in FIG. 1B, the shape of the particles is not limited to this shape.

In particular, the average particle diameter of the active material 103 increases when a baking temperature rises or the baking time increases. In such a case, crystal growth is encouraged, and thus edges of the particles of the active material 103 easily have a more angular shape.

1.2.1.3. Particle Diameter of Active Material with Layered Rock Salt Structure Although the active material 103 have a given average particle diameter, the average particle diameter is preferably greater than or equal to 0.1 μm and less than or equal to 50 μm, more preferably greater than or equal to 0.2 μm and less than or equal to 10 μm. Since the active material with the layered rock salt structure has conductivity and ionic conductivity higher than those of the active material with the olivine structure, an active material with a relatively large particle diameter can be used as the active material with the layered rock salt structure. However, in the case of using an active material having a plurality of average particle diameters whose particle size distribution has two or more peaks, the larger average particle diameter is preferably in the above range.

1.2.2. Graphene

In the positive electrode for a nonaqueous secondary battery of one embodiment of the present invention, the graphene 104 is included in the active material layer 102. The graphene 104 can function as a conductive additive.

Graphene is a carbon material having a crystal structure in which hexagonal skeletons of carbon are spread in a planar form and is one atomic plane extracted from graphite crystals. Due to its electrical, mechanical, or chemical characteristics which are surprisingly excellent, graphene has been expected to be applied to a variety of fields of, for example, field-effect transistors with high mobility, highly sensitive sensors, highly-efficient solar cells, and next-generation transparent conductive films and has attracted a great deal of attention.

Graphene in this specification includes single-layer graphene or multilayer graphene including two to hundred layers. The single-layer graphene refers to a sheet of one atomic layer of carbon molecules having π bonds.

Further, graphene oxide in this specification refers to a compound formed by oxidation of graphene. When graphene oxide is reduced to form graphene, oxygen contained in the graphene oxide is not entirely extracted and part of the oxygen remains in the graphene in some cases. When the graphene contains oxygen, the ratio of the oxygen measured by X-ray photoelectron spectroscopy (XPS) in the graphene is higher than or equal to 2 atomic % and lower than or equal to 20 atomic %, preferably higher than or equal to 3 atomic % and lower than or equal to 15 atomic %.

1.2.2.1. Network Through Graphene

In the positive electrode for a nonaqueous secondary battery of one embodiment of the present invention, the graphene 104 is dispersed into the active material layer 102 so that a piece of graphene overlaps with another piece of graphene and is in surface contact with a plurality of particles of the active material 103. In other words, a network for electron conduction is formed by the graphene 104 in the active material layer 102. This maintains the electron conduction path between the plurality of particles of the active material 103, which enables the active material layer 102 with high electron conductivity to be formed.

FIG. 1B illustrates the graphene 104 dispersed and attached to the periphery of the active material 103. The graphene 104 is a single layer or a stacked layer, and has a sheet-like shape. Thus, a portion where the graphene 104 is in contact with the active material 103 has a predetermined area (which is referred to as surface contact in this specification). Further, a piece of the graphene 104 is in surface contact with another piece of the graphene 104. Although pieces of the graphene 104 seem to be separated from each other in FIG. 1B, a piece of the graphene 104 is in contact with another piece of the graphene 104 in a depth direction in some cases. In such a manner, a plurality of pieces of the graphene 104 are in surface contact with each other to form the network for electron conduction in the entire active material layer 102. When particles of acetylene black (AB) or the like are used as a conductive additive in an active material layer, electron conductivity is low because an active material is in point contact with the conductive additive and the particles of the conductive additive are in point contact with each other. The active material layer 102 having a two-dimensional conductive path has electron conductivity higher than that of the active material layer including AB as the conductive additive.

In addition, since the graphene 104 has the sheet-like shape, the volume of the conductive additive can be reduced, as compared with the case of using acetylene black or the like. Thus, the weight ratio of the active material to the active material layer 102 can be increased.

In particular, when a material with the layered rock salt structure is used as the active material 103, the active material 103 does not need to be subjected to microparticulation because of its high conductivity and high ionic conductivity. The active material 103 having a large particle diameter of course has a large surface area, and thus is easily in surface contact with the graphene 104. Further, the contact area can be large. Particularly in the case where the active material 103 has a flat surface owing to its crystal structure, conductivity is easily ensured because the graphene 104 is easily in surface contact with the flat surface.

In addition, when the material with the layered rock salt structure is used as the active material 103, the ratio of the graphene 104 to the active material layer 102 as the conductive additive can be reduced because of its high conductivity and high ionic conductivity. Thus, the weight ratio of the active material to the active material layer in the positive electrode for a nonaqueous secondary battery can be increased.

1.2.2.2. Size of Graphene

A piece of the graphene 104 preferably has a size which enables sufficient surface contact with a particle of the active material 103 and moreover, enables surface contact with another piece of graphene 104 or another particles of the active material 103. For example, the length of one side of the graphene 104 is preferably greater than or equal to 50 nm and less than or equal to 100 μm, more preferably greater than or equal to 500 nm and less than or equal to 50 μm.

Accordingly, the size of graphene oxide which is used for forming graphene and described later is preferably in the above range.

1.2.3. Binder

In addition to the active material 103 and the graphene 104, the binder (not illustrated) is preferably included in the active material layer 102. With the use of the binder, the active material 103, the graphene 104, and the current collector 101 can be bonded to each other to increase the strength of the electrode.

Examples of the binder are polyvinylidene fluoride (PVdF), polyimide, polytetrafluoroethylene, polyvinyl chloride, an ethylene-propylene-diene polymer, styrene-butadiene rubber, acrylonitrile-butadiene rubber, fluorine rubber, polyvinyl acetate, polymethyl methacrylate, polyethylene, and nitrocellulose.

1.2.4. Structure of Active Material Layer

The weight ratio of the graphene 104 to the active material layer 102 is preferably higher than or equal to 0.05 wt % and lower than or equal to 5.3 wt %, the weight ratio of the active material 103 to the active material layer 102 is preferably higher than or equal to 84.2 wt % and lower than or equal to 98.9 wt %, and the weight ratio of the binder in the active material layer 102 is preferably higher than or equal to 1 wt % and lower than or equal to 10.5 wt %.

Figure 2A:
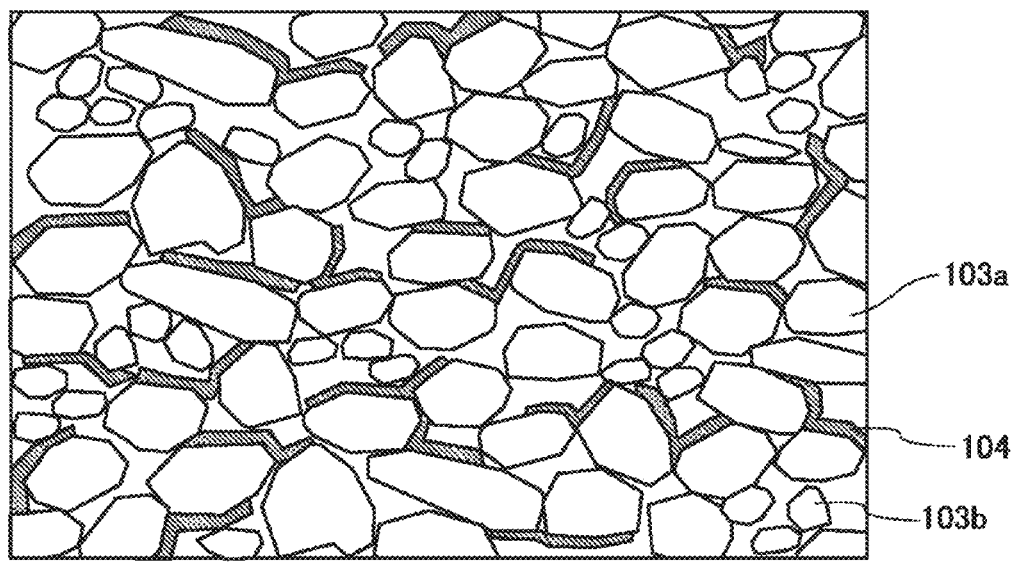
FIGS. 2A and 2B illustrate a positive electrode.

As the active material 103, several kinds of active materials having different average particle diameters may be used. FIG. 2A is a schematic view of the active material layer 102 including two kinds of active materials 103a and 103b with different average particle diameters. The active material 103a has a relatively large average particle diameter and the active material 103b has a relatively small average particle diameter. With the use of the active materials 103a and 103b, the active material 103b enters a gap between particles of the active material 103a, resulting in an increase in the ratio of the active material to the active material layer 102.

Figure 2B:
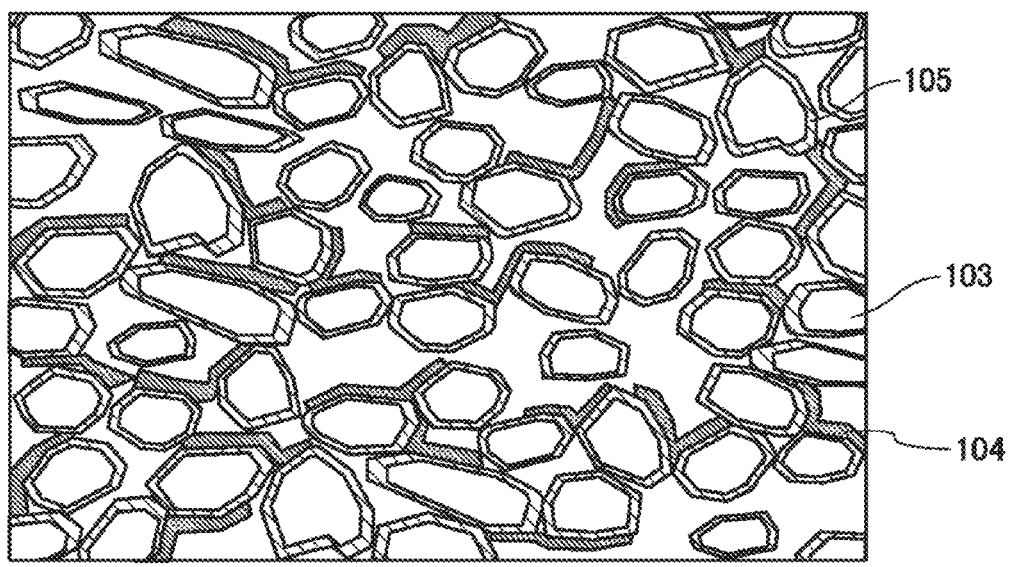

FIG. 2B is a schematic view of the active material layer 102 including the active material 103 whose surface is coated with a carbon layer 105 (carbon-coated). By coating the surface of the active material 103 with the carbon layer 105, the conductivity of the active material 103 can be increased. In such a case, the graphene 104 is in surface contact with the carbon layer 105 provided on the surface of the active material 103. Synergy between the carbon layer 105 and the graphene 104 can further increase the conductivity of the active material layer 102. In addition, a decrease in the weight ratio of the graphene 104 in the positive electrode can increase the weight ratio of the active material in the positive electrode. It should be noted that in the case of coating the surface of the active material 103 with the carbon layer 105 through heat treatment at high temperature, extraction of oxygen from the active material 103 might change composition.

Although not illustrated, several kinds of active materials with different average particle diameters may be used as the active material 103, and a surface of one or all thereof may be coated with a carbon layer. For example, when an active material with a relatively small average particle diameter is difficult to be in surface contact with graphene, only the active material with a relatively small average particle diameter may be coated with a carbon layer.

2. Method for Forming Positive Electrode for Nonaqueous Secondary Battery

Next, a method for forming the above-described positive electrode for a nonaqueous secondary battery is described with reference to FIG. 3, FIGS. 4A to 4C, and FIGS. 5A and 5B.

2.1. Method for Forming Active Material

First, a method for forming the active material with the layered rock salt structure is described.

First, raw materials are weighed so that the active material to be formed has appropriate composition. For example, in the case of forming lithium cobalt oxide ($LiCoO_2$) as the active material, a source of lithium, such as lithium carbonate ($Li_2CO_3$), and a source of cobalt, such as cobalt oxide ($Co_3O_4$), can be used as the raw materials. Next, the raw materials are mixed and crushed by mechanical milling with the use of a ball mill, a turbo mill, a vibration mill, a disc mill, or the like (Step S101). At the time of mixing and crushing, an organic solvent such as ethanol or acetone is added.

Then, the mixed and crushed raw materials are subjected to predrying to remove the organic solvent used in the above step (Step S102). The predrying can be performed at a temperature close to a boiling point of the organic solvent because the object of this step is to remove the organic solvent; for example, the predrying may be performed at 50° C. or higher for about 1 hour to 2 hours. A hot plate, an oven, a heating furnace, a halogen heater, an infrared heater, a hot air dryer, or the like may be used for the predrying.

Baking is performed after the predrying (Step S103). The baking is preferably performed in an air atmosphere. For example, the baking may be performed at 800° C. or higher and 1500° C. or lower for about 5 hours to 24 hours. A baking furnace such as a muffle furnace, a tunnel furnace, or a Rotary kiln can be used for the baking, for example.

Then, cracking is performed (Step S104). Through this step, aggregated particles of the active material are separated from each other. The cracking can be performed by the mechanical milling with the use of a ball mill, a turbo mill, a vibration mill, a disc mill, or the like.

Lastly, drying is performed (Step S105). This step removes moisture adsorbed onto the active material. The drying is performed at 80° C. or higher and 200° C. or lower for about 2 hours, for example. A vacuum dryer can be used for the drying. In such a case, pressure is 0.1 MPa, for example.

In the above manner, the active material with the layered rock salt structure, such as lithium cobalt oxide, can be obtained.

2.2. Dispersion Property of Graphene Oxide

In one embodiment of the present invention, graphene oxide is used as a raw material of graphene included in the active material layer; the graphene is graphene oxide when added to a paste. In this section, description is given of the difference between the case of adding graphene directly to a paste and the case of adding graphene oxide to a paste and then reducing the graphene oxide to give graphene.

2.2.1. Case of Adding Graphene Directly to Paste for Forming Active Material Layer An active material layer including graphene as a conductive additive without using graphene oxide as a raw material of the graphene can be formed by the following method. First, after the graphene is dispersed into a dispersion medium (also referred to as a solvent), a positive electrode active material is added thereto and a mixture is obtained by mixing. A binder is added to the mixture and the mixture is mixed, so that a paste is formed. Lastly, after the paste is applied to a positive electrode current collector, the dispersion medium is volatilized. Thus, the active material layer including graphene as a conductive additive is formed.

Here, to form a network for electron conduction in the active material layer by using graphene as a conductive additive, the graphene needs to be uniformly dispersed into the dispersion medium. This is because as for graphene, the property of dispersing into the dispersion medium directly depends on the property of dispersing into the active material layer. When the dispersion property of graphene is low, the graphene is aggregated and localized in the positive electrode active material layer, which prevents formation of the network. Thus, the dispersion property of graphene used as a conductive additive into a dispersion medium is an extremely important factor in the improvement of the electron conductivity of the active material layer.

However, by examining a positive electrode active material layer formed in such a way that graphene as a conductive additive was put in a dispersion medium together with an active material and a binder, the present inventors found that the dispersion property was insufficient and a network for electron conduction was not formed in the positive electrode active material layer. The present inventors found the same results by examining a positive electrode active material layer formed in such a way that, instead of graphene, graphene formed by reduction of graphene oxide (hereinafter referred to as "RGO", abbreviation of reduced graphene oxide), was put as a conductive additive in a dispersion medium.

2.2.2. Case of Adding Graphene Oxide to Paste for Forming Active Material Layer

In contrast, the present inventors have found that excellent electron conductivity is achieved by formation of a network for electron conduction in an active material layer obtained in such a way that, after graphene oxide as a conductive additive is put in a dispersion medium together with an active material and a binder to form a paste, the dispersed graphene oxide is reduced by heat treatment to form graphene.

Thus, while the dispersion property of graphene or RGO is low in an active material layer in which the graphene or the RGO is dispersed as a raw material of a conductive additive, the dispersion property of graphene formed by reducing graphene oxide after the graphene oxide is added to form a paste is good.

Such a difference in the properties of dispersing into an active material layer between the graphene or the RGO and the graphene formed by reducing graphene oxide after the paste including the graphene oxide is formed can be explained below as a difference in the properties of dispersing into a dispersion medium.

2.2.2.1. Property of Graphene Oxide Dispersing into Dispersion Medium

Figure 4A:
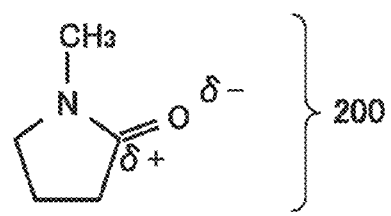
FIGS. 4A to 4C illustrate dispersion states in a polar solvent.

FIG. 4A illustrates a structural formula of NMP (1-methyl-2-pyrrolidone), which is a typical dispersion medium. NMP 200 is a compound having a five-membered ring structure and is one of polar solvents. As illustrated in FIG. 4A, in the NMP, oxygen is electrically negatively biased and carbon forming a double bond with the oxygen is electrically positively biased. Graphene, RGO, or graphene oxide is added to a diluent solvent having such a polarity.

Figure 4B:
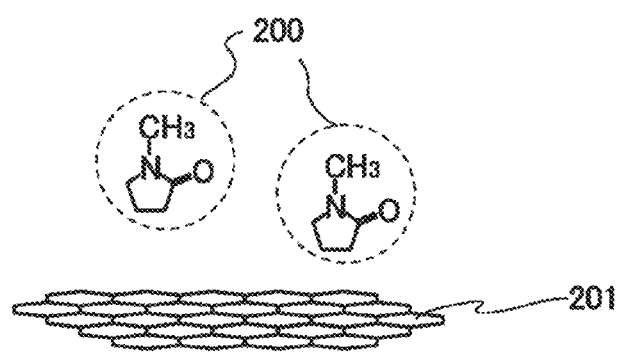
Figure 4C:
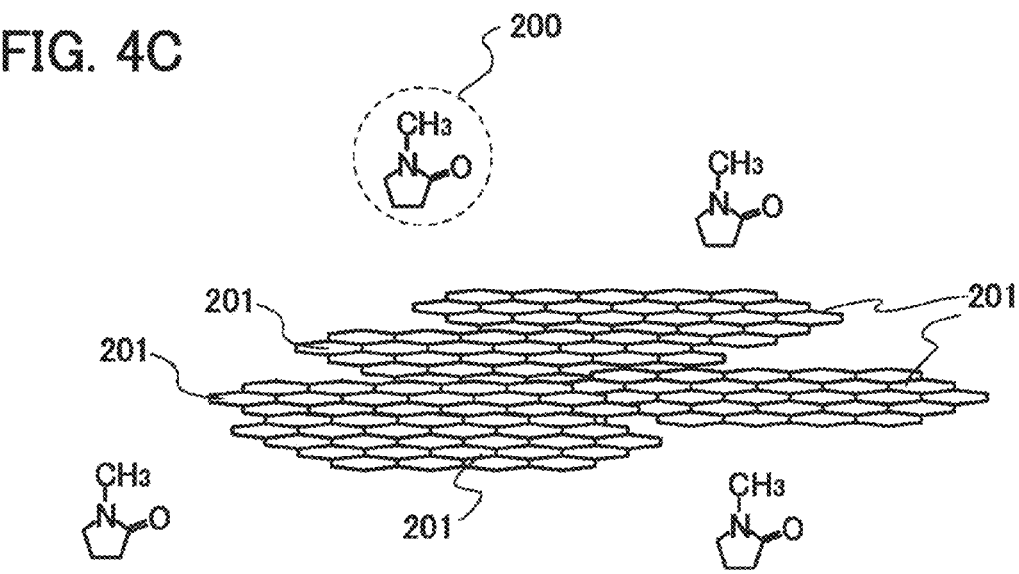

Graphene is a crystal structure body of carbon in which hexagonal skeletons are spread in a planar form as already described, and does not substantially include a functional group in the structure body. Further, the RGO is formed by reduction of functional groups originally included in the RGO by heat treatment, and the ratio of functional groups in the structure body is as low as about 10%. Consequently, as illustrated in FIG. 4B, a surface of graphene or RGO 201 does not have polarity and therefore has hydrophobicity. For this reason, while interaction between the NMP 200 which is a dispersion medium and the graphene or the RGO 201 is extremely weak, interaction probably occurs between pieces of the graphene or RGO 201 to cause aggregation of the pieces of the graphene or RGO 201 (see FIG. 4C).

Figure 5A:
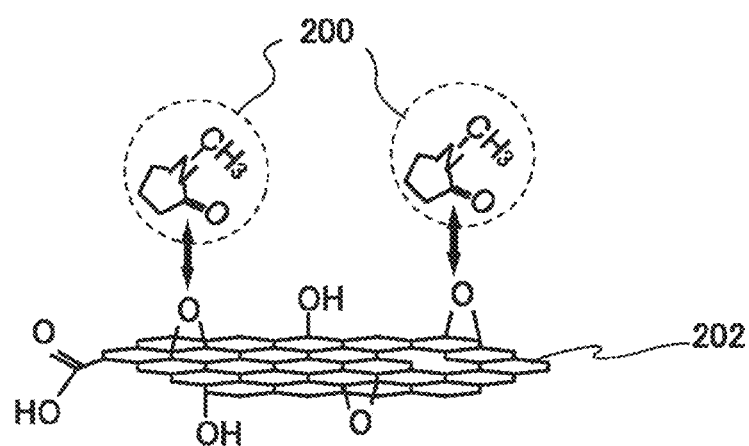
FIGS. 5A and 5B illustrate dispersion states in a polar solvent.
Figure 5B:
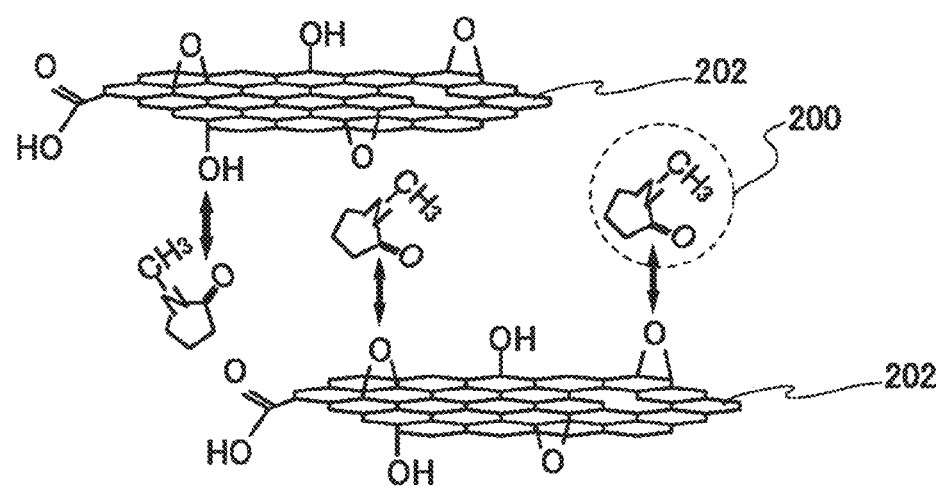

Graphene oxide 202 is a polar substance having a functional group such as an epoxy group, a carbonyl group, a carboxyl group, or a hydroxyl group. Oxygen in the functional group in the graphene oxide 202 is negatively charged in a polar solvent; hence, graphene oxide hardly aggregate in the polar solvent but strongly interact with the NMP 200 which is the polar solvent (see FIG. 5A). Thus, the functional group such as an epoxy group in the graphene oxide 202 interacts with the polar solvent as illustrated in FIG. 5B, which probably prevents aggregation among graphene oxide, resulting in uniform dispersion of the graphene oxide 202 in a dispersion medium (see FIG. 5B).

As described above, at the time of forming a paste, adding graphene oxide with a high dispersion property to the dispersion medium is extremely effective in using graphene which forms a network for electron conduction with high conductivity as a conductive additive of an active material layer. The dispersion property of graphene oxide in a dispersion medium probably depends on the quantity of functional groups having oxygen such as an epoxy group (i.e., the degree of oxidation of graphene oxide).

Here, in graphene oxide which is a raw material of graphene included in the active material layer, the atomic ratio of oxygen to carbon (O/C) is preferably greater than or equal to 0.405.

The atomic ratio of oxygen to carbon is an indicator of the degree of oxidation and represents the ratio of the number of oxygen atoms that are a constituent element of graphene oxide to the number of carbon atoms that are a constituent element of the graphene oxide (O/C). Note that the atomic ratio of elements included in graphene oxide can be measured by X-ray photoelectron spectroscopy (XPS), for example.

The atomic ratio of oxygen to carbon in graphene oxide which is greater than or equal to 0.405 means that the graphene oxide is a polar substance in which functional groups such as an epoxy group, a carbonyl group, a carboxyl group, or a hydroxyl group are sufficiently bonded to the graphene oxide for the high dispersion property of the graphene oxide in a polar solvent.

The graphene oxide in which the atomic ratio of oxygen to carbon is greater than or equal to 0.405 is dispersed into a dispersion medium together with a positive electrode active material and a binder, the mixture is mixed, the mixture is applied on a positive electrode current collector, and heating is performed. Thus, a positive electrode for a nonaqueous secondary battery which includes graphene with a high dispersion property and a network for electron conduction can be formed.

2.3. Method for Forming Graphene Oxide

Next, a method for forming graphene oxide described above is described.

Graphene oxide can be formed by an oxidation method called a Hummers method, for example. The Hummers method is as follows: a sulfuric acid solution of potassium permanganate, a hydrogen peroxide solution, or the like is mixed into a graphite powder to cause an oxidation reaction; thus, a dispersion liquid including graphite oxide is formed. Through the oxidation of carbon in graphite, functional groups such as an epoxy group, a carbonyl group, a carboxyl group, or a hydroxyl group are bonded in the graphite oxide. Accordingly, the interlayer distance between a plurality of pieces of graphene in the graphite oxide is longer than that in the graphite, so that the graphite oxide can be easily separated into thin pieces by interlayer separation. Then, ultrasonic vibration is applied to the mixed solution containing the graphite oxide, so that the graphite oxide whose interlayer distance is long can be cleaved to separate graphene oxide and to form a dispersion liquid containing graphene oxide. The solvent is removed from the dispersion liquid including the graphene oxide, so that powdery graphene oxide can be obtained.

Here, in the graphene oxide, the atomic ratio of oxygen to carbon can be adjusted by the amount of an oxidizer such as potassium permanganate. Specifically, the weight ratio of the oxidizer to the graphite powder is increased, and accordingly the degree of oxidation of the graphene oxide (the atomic ratio of oxygen to carbon) can be increased. The weight ratio of the oxidizer to the graphite powder which is a raw material can be determined depending on the weight of graphene oxide to be formed.

Note that the method for forming graphene oxide is not limited to the Hummers method using a sulfuric acid solution of potassium permanganate; for example, the Hummers method using nitric acid, potassium chlorate, nitric acid sodium, potassium permanganate, or the like or a method for forming graphene oxide other than the Hummers method may be employed as appropriate.

Graphite oxide may be separated into thin pieces by application of ultrasonic vibration, by irradiation with microwaves, radio waves, or thermal plasma, or by application of physical stress.

The formed graphene oxide includes an epoxy group, a carbonyl group, a carboxyl group, a hydroxyl group, or the like. In graphene oxide, oxygen in a functional group is negatively charged in a polar solvent typified by NMP; therefore, while interacting with NMP, the graphene oxide repels with other graphene oxide and is hardly aggregated. For this reason, in a polar solvent, graphene oxide can be easily dispersed uniformly.

2.4. Method for Forming Positive Electrode

Figure 6:
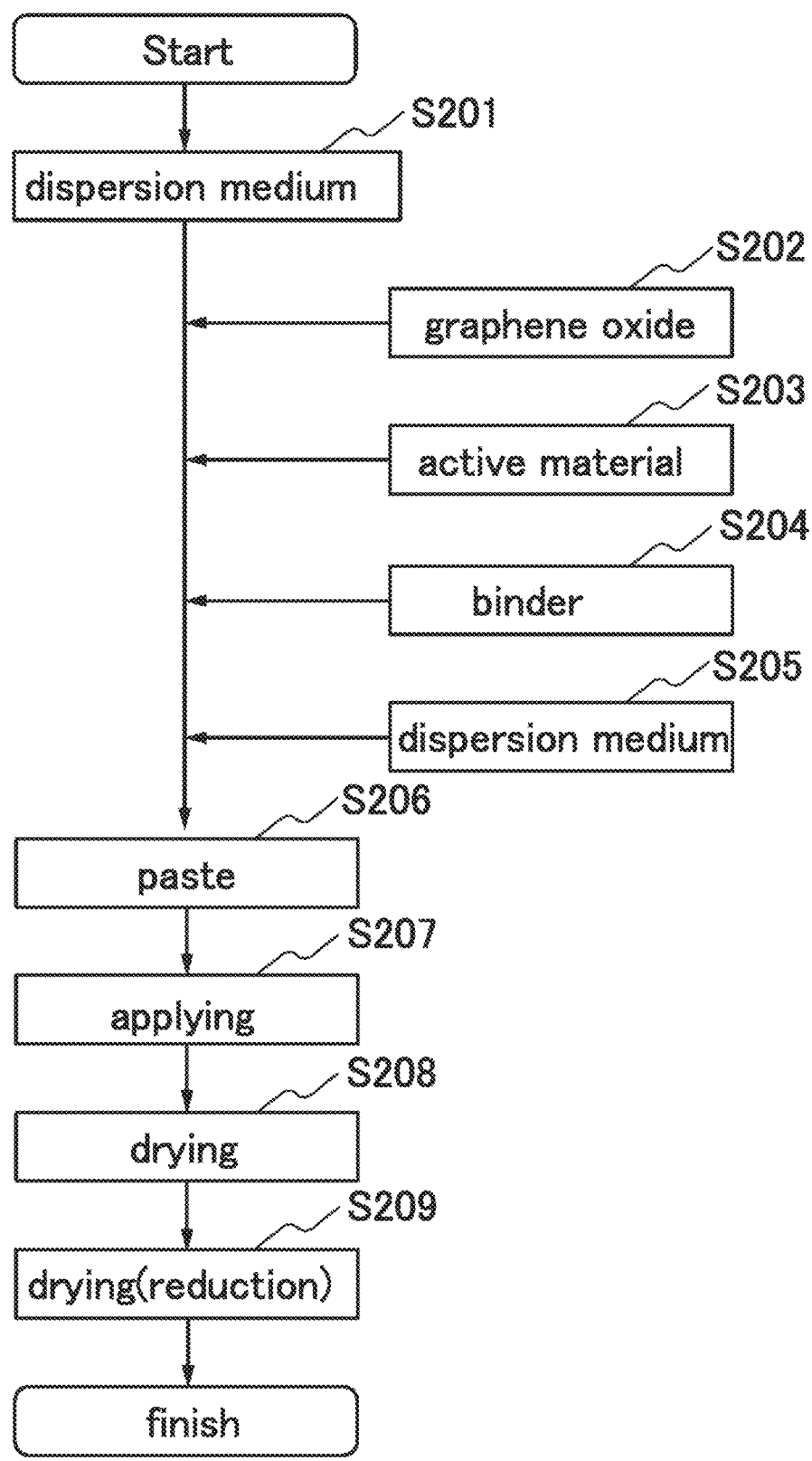
FIG. 6 is a flow chart illustrating a method for forming a positive electrode.

Next, a method for forming the positive electrode 100 including the active material layer 102 is described with reference to FIG. 6. The method is as follows: a paste is formed using the active material with the layered rock salt structure, graphene oxide, the binder, and the dispersion medium which are described above, applied onto the current collector 101, and then dried in a reducing atmosphere or under reduced pressure.

First, NMP is prepared as the dispersion medium (Step S201), and graphene oxide is dispersed into the NMP (Step S202). When the weight ratio of the graphene oxide to the total of the active material, the graphene oxide, and the binder in the paste is lower than 0.1 wt %, the conductivity is decreased when the active material layer 102 is formed. When the weight ratio of the graphene oxide in the paste exceeds 10 wt %, although it depends on the diameter of the active material particle, the viscosity of the paste is increased. In a drying step after the paste is applied to the current collector 101, convection is generated in the paste by heating and thin and lightweight graphene oxide moves and is aggregated, whereby a crack might be formed in the active material layer 102 or the active material layer 102 might be separated from the current collector 101. Thus, the weight ratio of graphene oxide to the total of the active material, the graphene oxide, and the binder in the paste is preferably set to 0.1 wt % to 10 wt %. Note that the graphene oxide is reduced in a heat treatment step performed later to give graphene and the weight is reduced by almost half, and consequently the weight ratio of the graphene oxide in the active material layer 102 becomes 0.05 wt % to 5.3 wt %.

Next, as the active material, the active material having the layered rock salt structure, such as lithium cobalt oxide, is added (Step S202). The active material with the layered rock salt structure preferably has an average particle diameter greater than or equal to 0.1 μm and less than or equal to 50 μm, more preferably greater than or equal to 0.2 μm and less than or equal to 10 μm. The ratio of the added active material in the paste is preferably higher than or equal to 80 wt %; for example, the ratio of the added active material in the paste is higher than or equal to 80 wt % and lower than or equal to 98.9 wt %.

Note that carbohydrate such as glucose may be mixed at the time of baking the active material to coat a surface of the active material with carbon. This treatment can further increase conductivity.

Next, the mixture is kneaded (the mixture is mixed at high viscosity), whereby aggregation of the graphene oxide and the active material with the layered rock salt structure can be reduced. Further, since the graphene oxide has a functional group, oxygen in the functional group is negatively charged in a polar solvent, which makes aggregation among graphene oxide difficult. The interaction between graphene oxide and the active material with the layered rock salt structure is strong. Hence, the graphene oxide can be further uniformly dispersed into the active material.

Next, the binder is added to the mixture (Step S204). The weight of the binder is determined based on the weight of graphene oxide, and that of the active material; the binder is added so that the weight ratio of the binder to the total of the binder, the graphene oxide, and the active material in the paste is higher than or equal to 0.1 wt % and lower than or equal to 10 wt %. The binder is added while the graphene oxide is uniformly dispersed to be in surface contact with the plurality of particles of the active material, so that the particles of the active material and the graphene oxide can be bound to each other with the graphene oxide kept dispersed. Although the binder is not necessarily added depending on the ratio of the active material and the ratio of the graphene oxide, adding the binder can enhance the strength of the positive electrode.

Next, the dispersion medium is added to the mixture until the mixture has predetermined viscosity (Step S205) and the mixture is mixed, whereby the paste can be formed (Step S206). Through the above steps, the paste in which the graphene oxide, the active material, and the binder are uniformly mixed can be formed.

It is preferable that, in the state of the paste, the weight ratio of the graphene oxide to the total of the active material, the graphene oxide, and the binder in the paste be higher than or equal to 0.1 wt % and lower than or equal to 10 wt %, the ratio of the active material in the paste be higher than or equal to 80 wt % and lower than or equal to 98.9 wt %, and the ratio of the binder in the paste be higher than or equal to 1 wt % and lower than or equal to 10 wt %. Further, it is preferable that, in the state of the active material layer obtained by applying the paste to the current collector and reducing the graphene oxide, the ratio of graphene to the active material layer be higher than or equal to 0.05 wt % and lower than or equal to 5.3 wt %, the ratio of the active material to the active material layer be higher than or equal to 84.2 wt % and lower than or equal to 98.9 wt %, and the ratio of the binder to the active material layer be higher than or equal to 1 wt % and lower than or equal to 10.5 wt %.

Next, the paste is applied onto the current collector 101 (Step S207).

Then, the paste applied onto the current collector 101 is dried (Step S208). The drying is performed by heating at 60° C. or higher and 170° C. or lower for 1 minute or longer and 10 hours or shorter to evaporate the dispersion medium. There is no particular limitation on the atmosphere.

Next, the paste is dried in a reduction atmosphere or under reduced pressure (Step S209). Heating is performed in a reducing atmosphere or under reduced pressure at 130° C. or higher and 200° C. or lower for 10 hours or longer and 30 hours or shorter, whereby the dispersion medium and water which are left in the paste are evaporated and oxygen contained in the graphene oxide is desorbed. Thus, the graphene oxide can be processed into graphene. Note that oxygen in the graphene oxide is not entirely extracted and partly remains in the graphene.

When the graphene contains oxygen, the ratio of oxygen measured by XPS in the graphene is higher than or equal to 2 atomic % and lower than or equal to 20 atomic %, preferably higher than or equal to 3 atomic % and lower than or equal to 15 atomic %. As the ratio of oxygen is lower, the conductivity of the graphene can be higher, so that a network with high electron conductivity can be formed. As the ratio of oxygen becomes higher, more gaps serving as paths of ions can be formed in the graphene.

Through the above steps, the positive electrode 100 including the active material layer 102 where the graphene 104 are uniformly dispersed can be formed. Note that a step of applying pressure to (a step of pressing) the positive electrode 100 may be performed after the drying step.

As described above, an active material is added to and mixed with a dispersion liquid of graphene oxide, so that the graphene oxide can be uniformly dispersed into the active material layer. By being added in a state where the graphene oxide is dispersed so as to be in contact with the plurality of the particles of the active material, the binder can be uniformly dispersed without hindering the contact between the graphene oxide and the plurality of particles of the active material. With the use of the paste formed in such a manner, a positive electrode for a nonaqueous secondary battery which is highly filled with the active material and includes the active material at high density can be formed. Further, when a battery is formed using the positive electrode, a nonaqueous secondary battery with high capacity can be manufactured. Since contact between sheets of graphene and the plurality of particles of the active material can be maintained by the binder, separation between the active material and the graphene can be prevented; thus, a nonaqueous secondary battery having good cycle characteristics can be manufactured.

3. Nonaqueous Secondary Battery

Next, structures of nonaqueous secondary batteries are described with reference to FIGS. 7A and 7B and FIGS. 8A and 8B.

3.1. Coin-Type Secondary Battery

Figure 7A:
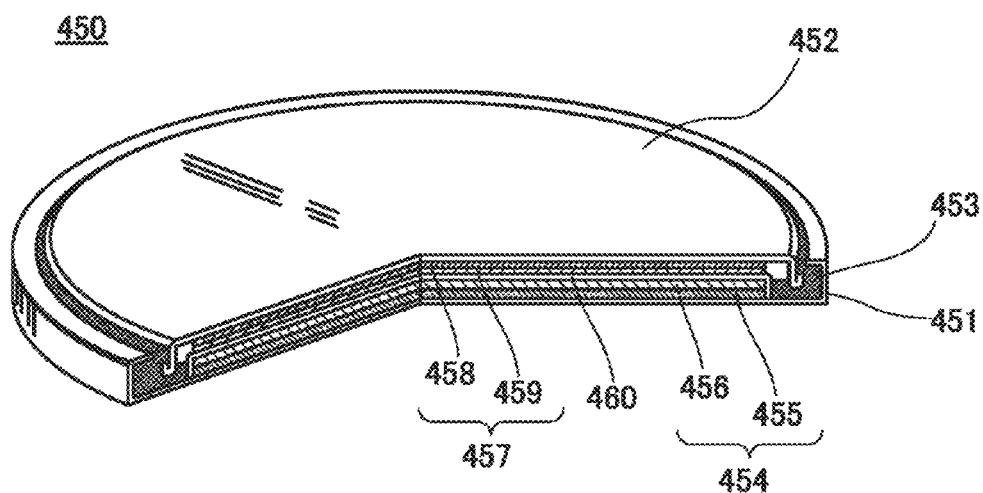
FIGS. 7A and 7B each illustrate a nonaqueous secondary battery.

FIG. 7A is an external view of a coin-type (single-layer flat type) lithium-ion secondary battery, part of which illustrates a cross-sectional view of the coin-type lithium-ion secondary battery.

In a coin-type secondary battery 450, a positive electrode can 451 serving also as a positive electrode terminal and a negative electrode can 452 serving also as a negative electrode terminal are insulated and sealed with a gasket 453 formed of polypropylene or the like. A positive electrode 454 includes a positive electrode current collector 455 and a positive electrode active material layer 456 which is provided to be in contact with the positive electrode current collector 455. A negative electrode 457 includes a negative electrode current collector 458 and a negative electrode active material layer 459 which is provided to be in contact with the negative electrode current collector 458. A separator 460 and an electrolyte solution (not illustrated) are included between the positive electrode active material layer 456 and the negative electrode active material layer 459.

The negative electrode 457 includes the negative electrode current collector 458 and the negative electrode active material layer 459. The positive electrode 454 includes the positive electrode current collector 455 and the positive electrode active material layer 456.

As the positive electrode 454, the positive electrode for a nonaqueous secondary battery of one embodiment of the present invention is used.

The negative electrode 457 is formed in such a manner that the negative electrode active material layer 459 is formed onto the negative electrode current collector 458 by a coating method, a CVD method, a sputtering method, or the like.

For the negative electrode current collector 458, it is possible to use a highly conductive material, for example, a metal such as copper, nickel, or titanium. The negative electrode current collector 458 can have a foil-like shape, a plate-like shape (sheet-like shape), a net-like shape, a punching-metal shape, an expanded-metal shape, or the like, as appropriate. The negative electrode current collector 458 preferably has a thickness of more than or equal to 10 μm and less than or equal to 30 μm.

There is no particular limitation on the material of the negative electrode active material as long as it is a material with which a metal can be dissolved/precipitated or a material into/from which metal ions can be inserted/extracted. Other than a lithium metal, graphite, which is a carbon material generally used in the field of power storage, can also be used as a negative electrode active material. Examples of graphite are low crystalline carbon such as soft carbon and hard carbon and high crystalline carbon such as natural graphite, kish graphite, pyrolytic carbon, mesophase pitch based carbon fiber, meso-carbon microbeads (MCMB), mesophase pitches, petroleum-based or coal-based coke, and the like.

As the negative electrode active material, other than the above carbon materials, an alloy-based material which enables a charge-discharge reaction by an alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, In, etc. can be used as the alloy-based material. Such metals have higher capacity than carbon. In particular, silicon has a significantly high theoretical capacity of 4200 mAh/g. For this reason, silicon is preferably used as the negative electrode active material.

The negative electrode active material layer 459 may be formed by a coating method in such a manner that a conductive additive or a binder is added to a negative electrode active material to form a negative electrode paste and the negative electrode paste is applied onto the negative electrode current collector 458 and dried.

Further, graphene is preferably formed on a surface of the negative electrode active material. In the case of using silicon as the negative electrode active material, the volume of silicon is greatly changed due to occlusion and release of carrier ions in charge-discharge cycles. Therefore, adhesion between the negative electrode current collector 458 and the negative electrode active material layer 459 is decreased, resulting in degradation of battery characteristics caused by charge and discharge. In view of this, graphene is preferably formed on a surface of the negative electrode active material containing silicon because even when the volume of silicon is changed in charge-discharge cycles, separation between the negative electrode current collector 458 and the negative electrode active material layer 459 can be prevented, which makes it possible to reduce degradation of battery characteristics.

Graphene formed on the surface of the negative electrode active material can be formed by reducing graphene oxide in a similar manner to that of the method for forming the positive electrode. As the graphene oxide, the above-described graphene oxide can be used.

As the separator 460, a porous insulator such as cellulose, polypropylene (PP), polyethylene (PE), polybutene, nylon, polyester, polysulfone, polyacrylonitrile, polyvinylidene fluoride, or tetrafluoroethylene can be used. Further, non-woven fabric of a glass fiber or the like, or a diaphragm in which a glass fiber and a polymer fiber are mixed may also be used.

As a solvent for the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

With the use of a gelled high-molecular material as the solvent for the electrolyte solution, safety against liquid leakage and the like is improved. Further, a secondary battery can be thinner and more lightweight. Typical examples of the gelled high-molecular material are a silicone gel, an acrylic gel, an acrylonitrile gel, polyethylene oxide, polypropylene oxide, and a fluorine-based polymer.

Alternatively, the use of one or more of ionic liquids (room temperature molten salts) which are less likely to burn and volatilize as the solvent for the electrolyte solution can prevent the secondary battery from exploding or catching fire even when the secondary battery internally shorts out or the internal temperature increases due to overcharging or the like.

As an electrolyte dissolved in the above-described solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

For the positive electrode can 451 and the negative electrode can 452, a metal having corrosion resistance to an electrolyte solution, such as nickel, aluminum, or titanium, an alloy of such a metal, or an alloy of such a metal and another metal (e.g., stainless steel) can be used. Alternatively, the positive electrode can 451 and the negative electrode can 452 are preferably coated with nickel, aluminum, or the like in order to prevent corrosion caused by the electrolyte solution. The positive electrode can 451 and the negative electrode can 452 are electrically connected to the positive electrode 454 and the negative electrode 457, respectively.

The negative electrode 457, the positive electrode 454, and the separator 460 are immersed in the electrolyte solution. Then, as illustrated in FIG. 7A, the positive electrode can 451, the positive electrode 454, the separator 460, the negative electrode 457, and the negative electrode can 452 are stacked in this order with the positive electrode can 451 positioned at the bottom, and the positive electrode can 451 and the negative electrode can 452 are subjected to pressure bonding with the gasket 453 provided therebetween. In such a manner, the coin-type secondary battery 450 is manufactured.

3.2. Laminated Secondary Battery

Figure 7B:
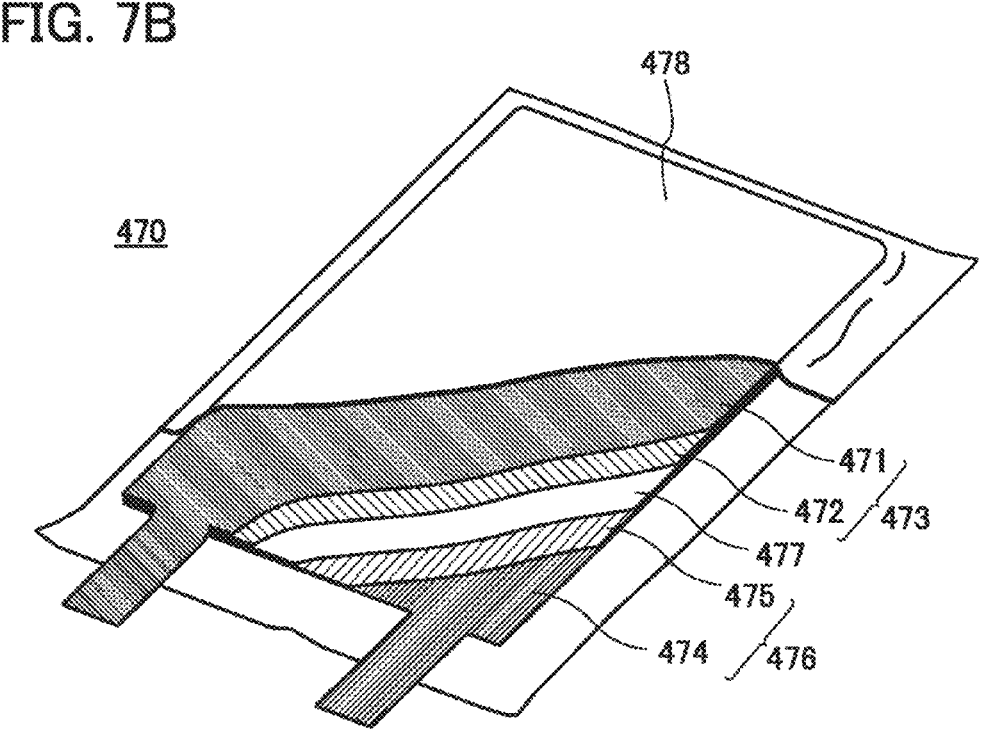

Next, an example of a laminated secondary battery is described with reference to FIG. 7B. In FIG. 7B, a structure inside the laminated secondary battery is partly exposed for convenience.

A laminated secondary battery 470 illustrated in FIG. 7B includes a positive electrode 473 including a positive electrode current collector 471 and a positive electrode active material layer 472, a negative electrode 476 including a negative electrode current collector 474 and a negative electrode active material layer 475, a separator 477, an electrolyte solution (not illustrated), and an exterior body 478. The separator 477 is placed between the positive electrode 473 and the negative electrode 476 provided in the exterior body 478. The exterior body 478 is filled with the electrolyte solution. Although the one positive electrode 473, the one negative electrode 476, and the one separator 477 are used in FIG. 7B, the secondary battery may have a stacked-layer structure in which positive electrodes, negative electrodes, and separators are alternately stacked.

The positive electrode for a nonaqueous secondary battery of one embodiment of the present invention is used as the positive electrode 473.

For the negative electrode, the separator, and the electrolyte solution (the electrolyte and the solvent), materials similar to those of the negative electrode, the separator, and the electrolyte solution in the above-described coin-type secondary battery can be used.

In the laminated secondary battery 470 illustrated in FIG. 7B, the positive electrode current collector 471 and the negative electrode current collector 474 also serve as terminals (tabs) for an electrical contact with the outside. For this reason, the positive electrode current collector 471 and the negative electrode current collector 474 are provided so that part of the positive electrode current collector 471 and part of the negative electrode current collector 474 are exposed outside the exterior body 478.

As the exterior body 478 in the laminated secondary battery 470, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used. With such a three-layer structure, permeation of the electrolyte solution and a gas can be blocked and an insulating property and resistance to the electrolyte solution can be obtained.

3.3. Cylindrical Secondary Battery

Next, examples of a cylindrical secondary battery are described with reference to FIGS. 8A and 8B. As illustrated in FIG. 8A, a cylindrical secondary battery 480 includes a positive electrode cap (battery cap) 481 on its top surface and a battery can (outer can) 482 on its side surface and bottom surface. The positive electrode cap 481 and the battery can 482 are insulated from each other with a gasket (insulating packing) 490.

FIG. 8B is a diagram schematically illustrating a cross-section of the cylindrical secondary battery. In the battery can 482 with a hollow cylindrical shape, a battery element is provided in which a strip-like positive electrode 484 and a strip-like negative electrode 486 are wound with a separator 485 provided therebetween. Although not illustrated, the battery element is wound around a center pin as a center. One end of the battery can 482 is close and the other end thereof is open.

The positive electrode for a nonaqueous secondary battery of one embodiment of the present invention is used as the positive electrode 484.

For the battery can 482, a metal having corrosion resistance to an electrolyte solution, such as nickel, aluminum, or titanium, an alloy of such a metal, or an alloy of such a metal and another metal (e.g., stainless steel) can be used. Alternatively, the battery can 482 is preferably coated with nickel, aluminum, or the like in order to prevent corrosion caused by the electrolyte solution. Inside the battery can 482, the battery element in which the positive electrode, the negative electrode, and the separator are wound is provided between a pair of insulating plates 488 and 489 which face each other.

An electrolyte solution (not illustrated) is injected inside the battery can 482 in which the battery element is provided. For the electrolyte solution, an electrolyte and a solvent which are similar to those in the above-described coin-type secondary battery or laminated secondary battery can be used.

Since the positive electrode 484 and the negative electrode 486 of the cylindrical secondary battery are wound, active material layers are formed on both sides of the current collectors. A positive electrode terminal (positive electrode current collecting lead) 483 is connected to the positive electrode 484, and a negative electrode terminal (negative electrode current collecting lead) 487 is connected to the negative electrode 486. A metal material such as aluminum can be used for both the positive electrode terminal 483 and the negative electrode terminal 487. The positive electrode terminal 483 and the negative electrode terminal 487 are resistance-welded to a safety valve mechanism 492 and the bottom of the battery can 482, respectively. The safety valve mechanism 492 is electrically connected to the positive electrode cap 481 through a positive temperature coefficient (PTC) element 491. In the case where an internal pressure of the battery is increased to exceed a predetermined threshold value, the safety valve mechanism 492 electrically disconnects the positive electrode cap 481 and the positive electrode 484. The PTC element 491 is a heat sensitive resistor whose resistance increases as temperature rises, and controls the amount of current by an increase in resistance to prevent unusual heat generation. Note that barium titanate ($BaTiO_3$)-based semiconductor ceramic and the like can be used for the PTC element.

As described above, the coin-type secondary battery, the laminated secondary battery, and the cylindrical secondary battery are given as examples of the secondary battery; however, any of secondary batteries with a variety of shapes, such as a sealed secondary battery and a square-type secondary battery, can be used. Further, a structure in which a plurality of positive electrodes, a plurality of negative electrodes, and a plurality of separators are stacked or wound may be employed.

4. Electrical Device Including Nonaqueous Secondary Battery

A nonaqueous secondary battery using the positive electrode for a nonaqueous secondary battery of one embodiment of the present invention can be used for power sources of a variety of electrical devices.

4.1. Range of Electrical Devices

Here, "electrical devices" refer to all general industrial products including portions which operate by electric power. Electrical devices are not limited to consumer products such as home electrical products and also include products for various uses such as business use, industrial use, and military use in their category.

4.2. Examples of Electrical Device

Examples of electrical devices each using the nonaqueous secondary battery of one embodiment of the present invention are as follows: display devices of televisions, monitors, and the like, lighting devices, desktop personal computers, laptop personal computers, word processors, image reproduction devices which reproduce still images or moving images stored in recording media such as digital versatile discs (DVDs), portable or stationary music reproduction devices such as compact disc (CD) players and digital audio players, portable or stationary radio receivers, recording reproduction devices such as tape recorders and IC recorders (voice recorders), headphone stereos, stereos, remote controls, clocks such as table clocks and wall clocks, cordless phone handsets, transceivers, mobile phones, car phones, portable or stationary game machines, pedometers, calculators, portable information terminals, electronic notebooks, e-book readers, electronic translators, audio input devices such as microphones, cameras such as still cameras and video cameras, toys, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, smoke detectors, and a health equipment and a medical equipment such as hearing aids, cardiac pacemakers, portable X-ray equipments, radiation counters, electric massagers, and dialyzers. The examples also include industrial equipment such as guide lights, traffic lights, meters such as gas meters and water meters, belt conveyors, elevators, escalators, automatic vending machines, automatic ticket machine, cash dispensers (CD), automated teller machines (ATM), digital signage, industrial robots, radio relay stations, mobile phone base stations, power storage systems, and secondary batteries for leveling the amount of power supply and smart grid. In addition, moving objects (transporters) driven by an electric motor using electric power from a secondary battery are also included in the category of the electrical devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, agricultural machines, motorized bicycles including motor-assisted bicycles, motorcycles, electric wheelchairs, electric carts, boats or ships, submarines, aircrafts such as fixed-wing aircraft and rotary-wing aircraft, rockets, artificial satellites, space probes, planetary probes, and spacecrafts.

In the electrical devices, the nonaqueous secondary battery one embodiment of the present invention can be used as a main power source for supplying enough electric power for almost the whole power consumption. Alternatively, in the electrical devices, the nonaqueous secondary battery of one embodiment of the present invention can be used as an uninterruptible power source which can supply power to the electrical devices when the supply of power from the main power source or a commercial power source is stopped. Still alternatively, in the electrical devices, the nonaqueous secondary battery of one embodiment of the present invention can be used as an auxiliary power source for supplying electric power to the electrical devices at the same time as the power supply from the main power source or a commercial power source.

4.3. Example of Electric Power Network

The electrical devices may each include a secondary battery or may be connected wirelessly or with a wiring to one or more of secondary batteries and a control device controlling the electrical devices and one or more of the secondary batteries to form a network (electric power network). The network controlled by the control device can improve usage efficiency of electric power in the whole network.

Figure 9A:
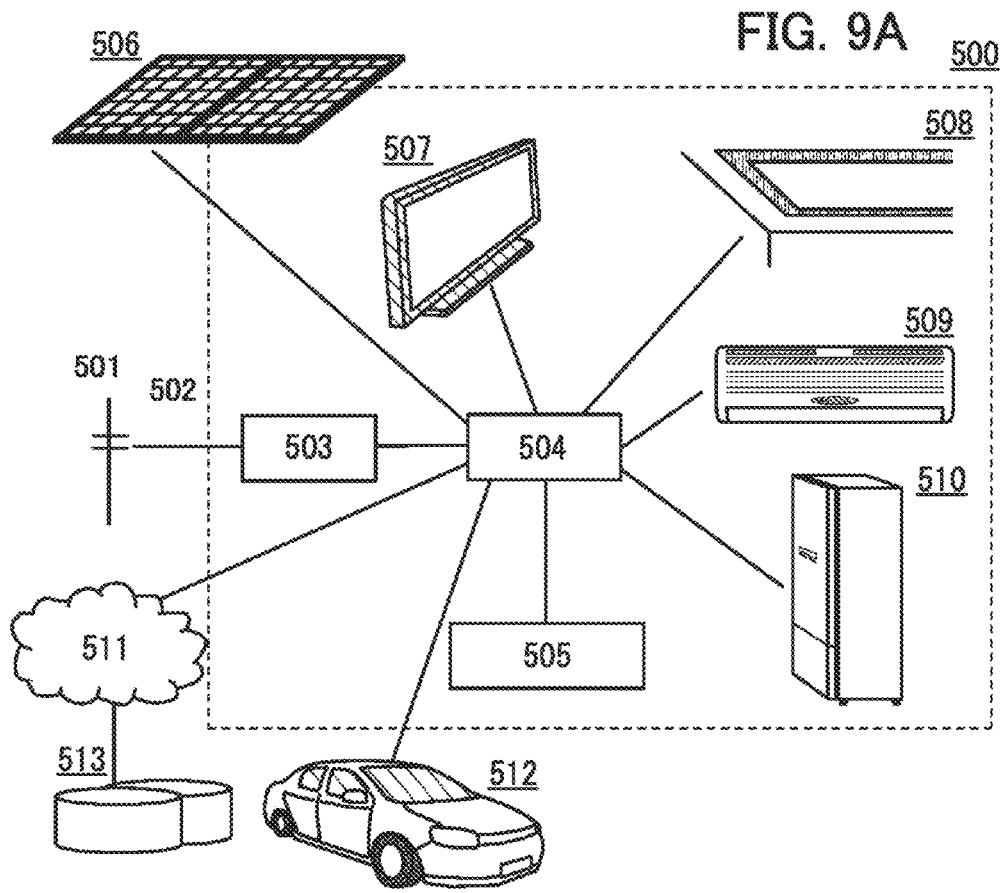
FIGS. 9A to 9C illustrate electrical devices.

FIG. 9A illustrates an example of a home energy management system (HEMS) in which a plurality of home appliances, a control device, a secondary battery, and the like are connected in a house. Such a system makes it possible to check easily the power consumption of the whole house. In addition, the plurality of home appliances can be operated with a remote control. Further, automatic control of the home appliances with a sensor or the control device can also contribute to low power consumption.

A distribution board 503 set in a house 500 is connected to an electric power system 501 through a service wire 502. The distribution board 503 supplies AC power which is electric power supplied from a commercial power source through the service wire 502 to each of the plurality of home appliances. A control device 504 is connected to the distribution board 503 and also connected to the plurality of home appliances, a power storage system 505, a solar power generation system 506, and the like. Further, the control device 504 can also be connected to an electric vehicle 512 which is parked outside the house 500 or the like and operates independently of the distribution board 503.

The control device 504 connects the distribution board 503 to the plurality of home appliances to form a network, and controls the plurality of home appliances connected to the network.

In addition, the control device 504 is connected to Internet 511 and thus can be connected to a management server 513 through the Internet 511. The management server 513 receives data on the status of electric power usage of users and therefore can create a database and can provide the users with a variety of services based on the database. Further, as needed, the management server 513 can provide the users with data on electric power charge for a corresponding time zone, for example. On the basis of the data, the control device 504 can set an optimized usage pattern in the house 500.

Examples of the plurality of home appliances are a display device 507, a lighting device 508, an air-conditioning system 509, and an electric refrigerator 510 which are illustrated in FIG. 9A. However, the plurality of home appliances are not limited to these examples, and refer to a variety of electrical devices which can be set inside a house, such as the above-described electrical devices.

In a display portion of the display device 507, a semiconductor display device such as a liquid crystal display device, a light-emitting device including a light-emitting element, e.g., an organic electroluminescent (EL) element, in each pixel, an electrophoretic display device, a digital micromirror device (DMD), a plasma display panel (PDP), or a field emission display (FED) is provided, for example. A display device functioning as a display device for displaying information, such as a display device for TV broadcast reception, a personal computer, advertisement, or the like, is included in the category of the display device 507.

The lighting device 508 includes an artificial light source which generates light artificially by utilizing electric power in its category. Examples of the artificial light source are an incandescent lamp, a discharge lamp such as a fluorescent lamp, and a light-emitting element such as a light emitting diode (LED) and an organic EL element. Although being provided on a ceiling in FIG. 9A, the lighting device 508 may be installation lighting provided on a wall, a floor, a window, or the like or desktop lighting.

The air-conditioning system 509 has a function of adjusting an indoor environment such as temperature, humidity, and air cleanliness. FIG. 9A illustrates an air conditioner as an example. The air conditioner includes an indoor unit in which a compressor, an evaporator, and the like are integrated and an outdoor unit (not illustrated) in which a condenser is incorporated, or an integral unit thereof.

The electric refrigerator 510 is an electrical device for the storage of food and the like at low temperature and includes a freezer for freezing at 0° C. or lower. A refrigerant in a pipe which is compressed by a compressor absorbs heat when vaporized, and thus inside the electric refrigerator 510 is cooled.

The plurality of home appliances may each include a secondary battery or may use electric power supplied from the power storage system 505 or the commercial power source without including the secondary battery. By using a secondary battery as an uninterruptible power source, the plurality of home appliances each including the secondary battery can be used even when electric power cannot be supplied from the commercial power source due to power failure or the like.

In the vicinity of a terminal for power supply in each of the above-described home appliances, an electric power sensor such as a current sensor can be provided. Data obtained with the electric power sensor is send to the control device 504, which makes it possible for users to check the used amount of electric power of the whole house. In addition, on the basis of the data, the control device 504 can determine the distribution of electric power supplied to the plurality of home appliances, resulting in the efficient or economical use of electric power in the house 500.

In a time zone when the usage rate of electric power which can be supplied from the commercial power source is low, the power storage system 505 can be charged with electric power from the commercial power source. Further, with the use of the solar power generation system 506, the power storage system 505 can be charged during the daytime. Note that an object to be charged is not limited to the power storage system 505, and a secondary battery included in the electric vehicle 512 and the secondary batteries included in the plurality of home appliances which are connected to the control device 504 may each be the object to be charged.

Electric power stored in a variety of secondary batteries in such a manner is efficiently distributed by the control device 504, resulting in the efficient or economical use of electric power in the house 500.

As an example of controlling a network of a plurality of electrical devices, one or more of secondary batteries, and a control device which controls the electrical devices and one or more of the secondary batteries, the example of controlling an electric power network on a house scale is described above; however, the scale of the electric power network is not limited thereto. An electric power network on an urban scale or a national scale (also referred to as a smart grid) can be created by a combination of a control device such as a smart meter and a communication network. Further, a microgrid which is on a scale of a factory or an office and includes an energy supply source and a plant consuming electric power as units can be constructed.

4.4. Example of Electrical Device (Example of Electric Vehicle)

Next, as an example of the electrical devices, a moving object is described with reference to FIGS. 9B and 9C. The secondary battery of one embodiment of the present invention can be used as a secondary battery for controlling the moving object.

Figure 9B:
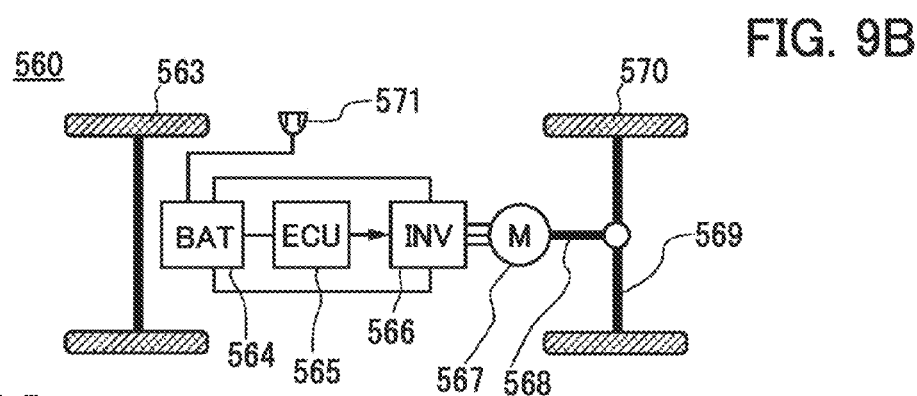
Figure 9C:
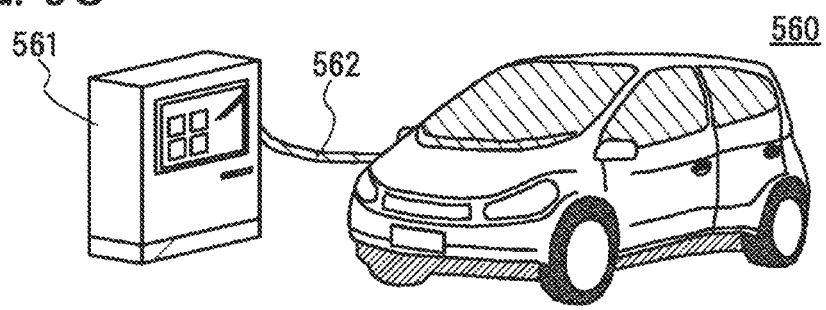

FIG. 9B illustrates an example of a structure inside an electric vehicle. An electric vehicle 560 includes a secondary battery 564 that can be charged and discharged. Output of electric power of the secondary battery 564 is adjusted by an electronic control unit (ECU) 565 so that the electric power is supplied to a drive motor unit 567 through an inverter unit 566. The inverter unit 566 can convert DC power input from the secondary battery 564 into three phase AC power, can adjust the voltage, current, and frequency of the converted AC power, and can output the AC power to the drive motor unit 567.

Thus, when a driver presses an accelerator pedal (not illustrated), the drive motor unit 567 works, so that torque generated in the drive motor unit 567 is transferred to rear wheels (drive wheels) 570 through an output shaft 568 and a drive shaft 569. Front wheels 563 are operated following the rear wheels 570, whereby the electric vehicle 560 can be driven.

Sensors such as a voltage sensor, a current sensor, and a temperature sensor are provided in each of the units to monitor physical values of each part of the electric vehicle 560, as appropriate.

The electronic control unit 565 is a processing device including a memory such as a RAM or a ROM, and a CPU, which are not illustrated. The electronic control unit 565 outputs a control signal to the inverter unit 566, the drive motor unit 567, or the secondary battery 564 on the basis of operational information of the electric vehicle 560 (e.g., acceleration, deceleration, or a stop), temperature information of a driving environment or each unit, control information, or input data on the state of charge (SOC) of the secondary battery or the like. Various data and programs are stored in the memory.

The drive motor unit 567 can be used in combination with any of an AC motor, a DC motor, and an internal-combustion engine.

Note that it is needless to say that one embodiment of the present invention is not limited to the moving object described above as long as the secondary battery of one embodiment of the present invention is included.

The secondary battery 564 included in the electric vehicle 560 can be charged by being supplied with electric power through external charging equipment by a plug-in system, a contactless power supply system, or the like. FIG. 9C illustrates the state where the secondary battery 564 included in the electric vehicle 560 is charged with the use of a ground-based charging apparatus 561 through a cable 562. In charging, a given method such as CHAdeMO (registered trademark) may be referred to for a charging method, the standard of a connector, or the like as appropriate. The charging apparatus 561 may be a charging station provided in a commerce facility or a power source in a house. For example, with the use of a plug-in technique in which a connecting plug 571 illustrated in FIG. 9B and connected to the secondary battery 564 is electrically connected to the charging apparatus 561, the secondary battery 564 included in the electric vehicle 560 can be charged by being supplied with electric power from outside. The secondary battery 564 can be charged by converting external electric power into DC constant voltage having a predetermined voltage level through a converter such as an AC-DC converter.

Further, although not illustrated, a power receiving device may be included in the moving object to charge the secondary battery by supplying electric power from an aboveground power transmitting device in a non-contact manner. In the case of the contactless power supply system, by fitting the power transmitting device in a road or an exterior wall, charging can be performed not only when the electric vehicle is stopped but also when driven. In addition, the contactless power supply system may be utilized to perform transmission/reception between moving objects. Furthermore, a solar cell may be provided in an exterior of the moving object to charge the secondary battery 564 when the electric vehicle is stopped or driven.

Note that in the case where the moving object is an electric railway vehicle, a secondary battery included therein can be charged by being supplied with electric power from an overhead cable or a conductor rail.

With the use of the secondary battery of one embodiment of the present invention as the secondary battery 564, the secondary battery 564 can have favorable cycle characteristics and improved convenience. When the secondary battery 564 itself can be more compact and more lightweight as a result of improved characteristics of the secondary battery 564, the electric vehicle can be lightweight and fuel efficiency can be increased. Further, the secondary battery 564 included in the moving object has relatively large capacity; therefore, the secondary battery 564 can be used as an electric power supply source for indoor use, for example. In such a case, the use of a commercial power source can be avoided at peak time of electric power demand.

4.5. Example of Electrical Device (Example of Portable Information Terminal)

In addition, as another example of the electrical devices, a portable information terminal is described with reference to FIGS. 10A to 10C.

Figure 10A:
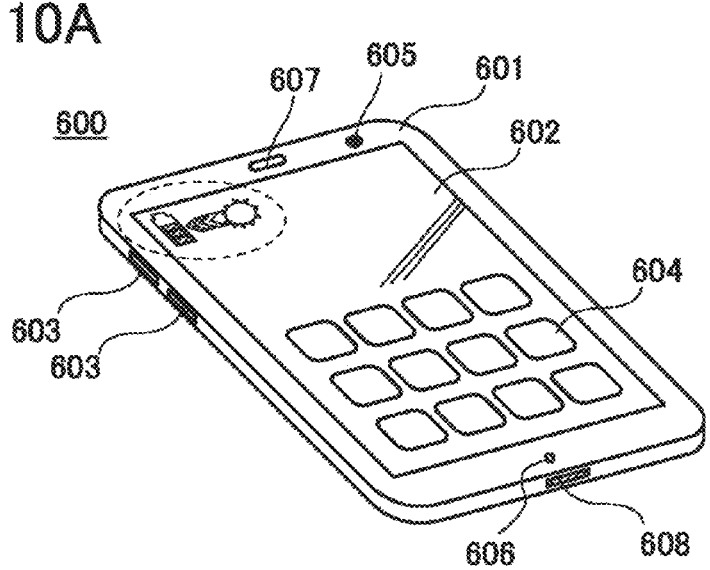
FIGS. 10A to 10C illustrate an electrical device.

FIG. 10A is a perspective view illustrating a front surface and a side surface of a portable information terminal 600. The portable information terminal 600 is capable of executing a variety of applications such as mobile phone calls, e-mailing, viewing and editing texts, music reproduction, Internet communication, and a computer game. In the portable information terminal 600, a housing 601 includes a display portion 602, a camera lens 605, a microphone 606, and a speaker 607 on its front surface, a button 603 for operation on its left side, and a connection terminal 608 on its bottom surface.

A display module or a display panel is used for the display portion 602. Examples of the display module or the display panel are a light-emitting device in which each pixel includes a light-emitting element typified by an organic light-emitting element (OLED); a liquid crystal display device; an electronic paper performing a display in an electrophoretic mode, an electronic liquid powder (registered trademark) mode, or the like; a digital micromirror device (DMD); a plasma display panel (PDP); a field emission display (FED); a surface conduction electron-emitter display (SED); a light-emitting diode (LED) display; a carbon nanotube display; a nanocrystal display; and a quantum dot display.

The portable information terminal 600 illustrated in FIG. 10A is an example of providing the one display portion 602 in the housing 601; however, one embodiment of the present invention is not limited to this example. The display portion 602 may be provided on a rear surface of the portable information terminal 600. Further, the portable information terminal 600 may be a foldable portable information terminal in which two or more display portions are provided.

A touch panel with which data can be input by an instruction means such as a finger or a stylus is provided as an input means on the display portion 602. Therefore, icons 604 displayed on the display portion 602 can be easily operated by the instruction means. Since the touch panel is provided, a region for a keyboard on the portable information terminal 600 is not needed and thus the display portion can be provided in a large region. Further, since data can be input with a finger or a stylus, a user-friendly interface can be obtained. Although the touch panel may be of any of various types such as a resistive type, a capacitive type, an infrared ray type, an electromagnetic induction type, and a surface acoustic wave type, the resistive type or the capacitive type is particularly preferable because the display portion 602 of one embodiment of the present invention can be curved. Furthermore, such a touch panel may be what is called an in-cell touch panel, in which a touch panel is integral with the display module or the display panel.

The touch panel may also function as an image sensor. In this case, for example, an image of a palm print, a fingerprint, or the like is taken with the display portion 602 touched with the palm or the finger, whereby personal authentication can be performed. Furthermore, with the use of backlight or a sensing light source emitting near-infrared light for the display portion 602, an image of a finger vein, a palm vein, or the like can also be taken.

Further, instead of the touch panel, a keyboard may be provided in the display portion 602. Furthermore, both the touch panel and the keyboard may be provided.

The button 603 for operation can have various functions in accordance with the intended use. For example, the button 603 may be used as a home button so that a home screen is displayed on the display portion 602 by pressing the button 603. Further, the portable information terminal 600 may be configured such that main power source thereof is turned off with a press of the button 603 for a predetermined time. A structure may also be employed in which a press of the button 603 brings the portable information terminal 600 which is in a sleep mode out of the sleep mode. Besides, the button can be used as a switch for starting a variety of functions, for example, depending on the length of time for pressing or by pressing the button at the same time as another button.

Further, the button 603 may be used as a volume control button or a mute button to have a function of adjusting the volume of the speaker 607 for outputting sound, for example. The speaker 607 outputs various kinds of sound, examples of which are sound set for predetermined processing, such as startup sound of an operating system (OS), sound from sound files executed in various applications, such as music from music reproduction application software, and an incoming e-mail alert. Although not illustrated, a connector for outputting sound to a device such as headphones, earphones, or a headset may be provided together with or instead of the speaker 607 for outputting sound.

As described above, the button 603 can have various functions. Although the number of the button 603 is two in the portable information terminal 600 in FIG. 10A, it is needless to say that the number, arrangement, position, or the like of the buttons is not limited to this example and can be designed as appropriate.

The microphone 606 can be used for sound input and recording. Images obtained with the use of the camera lens 605 can be displayed on the display portion 602.

In addition to the operation with the touch panel provided on the display portion 602 or the button 603, the portable information terminal 600 can be operated by recognition of user's movement (gesture) (also referred to as gesture input) using the camera lens 605, a sensor provided in the portable information terminal 600, or the like. Alternatively, with the use of the microphone 606, the portable information terminal 600 can be operated by recognition of user's voice (also referred to as voice input). By introducing a natural user interface (NUI) technique which enables data to be input to an electrical device by natural behavior of a human, the operational performance of the portable information terminal 600 can be further improved.

The connection terminal 608 is a terminal for inputting a signal at the time of communication with an external device or inputting electric power at the time of power supply. For example, the connection terminal 608 can be used for connecting an external memory drive to the portable information terminal 600. Examples of the external memory drive are storage medium drives such as an external hard disk drive (HDD), a flash memory drive, a digital versatile disk (DVD) drive, a DVD-recordable (DVD-R) drive, a DVD-rewritable (DVD-RW) drive, a compact disc (CD) drive, a compact disc recordable (CD-R) drive, a compact disc rewritable (CD-RW) drive, a magneto-optical (MO) disc drive, a floppy disk drive (FDD), and a nonvolatile solid state drive (SSD) device different from the above. Although the portable information terminal 600 has the touch panel on the display portion 602, a keyboard may be provided on the housing 601 instead of the touch panel or may be externally added.

Although the number of the connection terminal 608 is one in the portable information terminal 600 in FIG. 10A, it is needless to say that the number, arrangement, position, or the like of the connection terminals is not limited to this example and can be designed as appropriate.

Figure 10B:
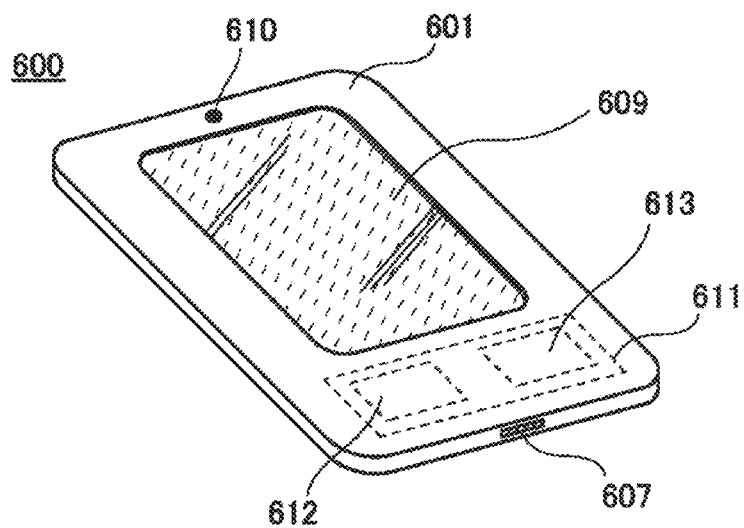

FIG. 10B is a perspective view illustrating the rear surface and the side surface of the portable information terminal 600. In the portable information terminal 600, the housing 601 includes a solar cell 609 and a camera lens 610 on its rear surface; the portable information terminal 600 further includes a charge and discharge control circuit 611, a secondary battery 612, a DC-DC converter 613, and the like. FIG. 10B illustrates an example where the charge and discharge control circuit 611 includes the secondary battery 612 and the DC-DC converter 613. The nonaqueous secondary battery of one embodiment of the present invention, which is described in the above embodiment, is used as the secondary battery 612.

The solar cell 609 attached on the rear surface of the portable information terminal 600 can supply power to the display portion, the touch panel, a video signal processor, and the like. Note that the solar cell 609 can be provided on one or both surfaces of the housing 601. By including the solar cell 609 in the portable information terminal 600, the secondary battery 612 in the portable information terminal 600 can be charged even in a place where an electric power supply unit is not provided, such as outdoors.

As the solar cell 609, it is possible to use any of the following: a silicon-based solar cell including a single layer or a stacked layer of single crystal silicon, polycrystalline silicon, microcrystalline silicon, or amorphous silicon; an InGaAs-based, GaAs-based, CIS-based, $Cu_2ZnSnS_4$-based, or CdTe—CdS-based solar cell; a dye-sensitized solar cell including an organic dye; an organic thin film solar cell including a conductive polymer, fullerene, or the like; a quantum dot solar cell having a pin structure in which a quantum dot structure is formed in an i-layer with silicon or the like; and the like.

Here, an example of a structure and operation of the charge and discharge control circuit 611 illustrated in FIG. 10B is described with reference to a block diagram in FIG. 10C.

Figure 10C:
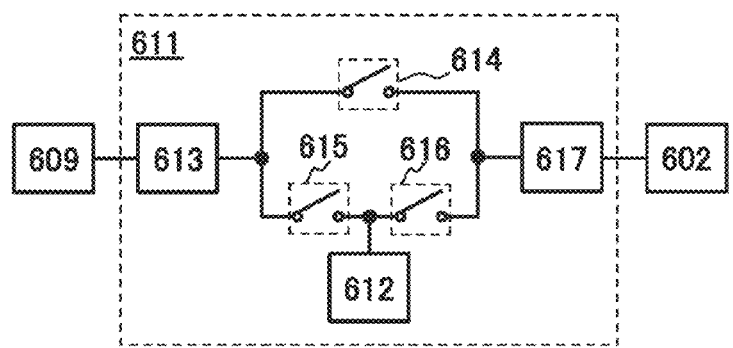

FIG. 10C illustrates the solar cell 609, the secondary battery 612, the DC-DC converter 613, a converter 617, a switch 614, a switch 615, a switch 616, and the display portion 602. The secondary battery 612, the DC-DC converter 613, the converter 617, and the switches 614 to 616 correspond to the charge and discharge control circuit 611 in FIG. 10B.

The voltage of electric power generated by the solar cell 609 with the use of external light is raised or lowered by the DC-DC converter 613 to be at a level needed for charging the secondary battery 612. When electric power from the solar cell 609 is used for the operation of the display portion 602, the switch 614 is turned on and the voltage of the electric power is raised or lowered by the converter 617 to a voltage needed for operating the display portion 602. In addition, when display on the display portion 602 is not performed, the switch 614 is turned off and the switch 615 is turned on so that the secondary battery 612 may be charged.

Although the solar cell 609 is described as an example of a power generation means, the power generation means is not particularly limited thereto, and the secondary battery 612 may be charged by another power generation means such as a piezoelectric element or a thermoelectric conversion element (Peltier element). The charging method of the secondary battery 612 in the portable information terminal 600 is not limited thereto, and the connection terminal 608 may be connected to a power source to perform charge, for example. The secondary battery 612 may be charged by a non-contact power transmission module performing charge by transmitting and receiving electric power wirelessly (without contact), or any of the above charging methods may be used in combination.

Here, the state of charge (SOC) of the secondary battery 612 is displayed on the upper left corner (in the dashed frame in FIG. 10A) of the display portion 602. Thus, the user can check the state of charge of the secondary battery 612 and can accordingly select a power saving mode of the portable information terminal 600. When the user selects the power saving mode, for example, the button 603 or the icons 604 can be operated to switch the components of the portable information terminal 600, e.g., the display module or the display panel, an arithmetic unit such as CPU, and a memory, to the power saving mode. Specifically, in each of the components, the use frequency of a given function is decreased to stop the use. Further, the portable information terminal 600 can be configured to be automatically switched to the power saving mode depending on the state of charge. Furthermore, by providing a sensor such as an optical sensor in the portable information terminal 600, the amount of external light at the time of using the portable information terminal 600 is sensed to optimize display luminance, which makes it possible to reduce the power consumption of the secondary battery 612.

In addition, when charging with the use of the solar cell 609 or the like is performed, an image or the like showing that the charging is performed with the solar cell may be displayed on the upper left corner (in the dashed frame) of the display portion 602 as illustrated in FIG. 10A.

It is needless to say that one embodiment of the present invention is not limited to the electrical device illustrated in FIGS. 10A to 10C as long as the secondary battery of one embodiment of the present invention is included.

EXAMPLE 1

The positive electrode for a nonaqueous secondary battery of one embodiment of the present invention is specifically described below with the use of this example. In this example, NMC was used as an active material in forming the positive electrode for a nonaqueous secondary battery of one embodiment of the present invention. Note that the present invention is not limited to this example.

(Formation of Active Material (NMC))

First, as the active material, $LiNi_{1/3}Mn_{1/3}Co_{1/3}O_2$ that is a kind of NMC having a layered rock salt structure was formed. Hereinafter $LiNi_{1/3}Mn_{1/3}Co_{1/3}O_2$ is referred to as NMC for convenience. $Li_2CO_3$, $NiO$, $MnO_2$, and $Co_3O_4$ were used as raw materials to form NMC and weighed to satisfy the above composition.

Next, the raw materials were mixed and crushed with a planetary ball mill. With the use of a 500 ml zirconia pot and 300 g of zirconia balls with a diameter of 3 mm, the raw materials with a total weight of 150 g were subjected to ball milling at a rotation speed of 300 rpm for 2 hours. In the mixing and crushing, 250 ml acetone was used as a solvent.

Next, predrying was performed with a hot plate. The predrying was performed in the air at 50° C. for 1 hour to 2 hours with an air flow of 0.5 m/s wind velocity.

Then, with the use of a vacuum dryer, drying was performed in a vacuum of 0.1 MPa at 80° C. for 2 hours. The steps up to the drying step were performed in a dry room with a dew point higher than or equal to −70° C. and lower than or equal to −55° C.

Next, with the use of a muffle furnace, baking was performed in an air atmosphere at 950° C. for 5 hours. A temperature rising rate of the muffle furnace was 200° C./h.

Then, aggregates of particles of the active material were cracked by the ball mill. The cracking was performed in the same condition as the mixing and crushing of the raw materials except that treatment time was 30 minutes.

Lastly, with the use of the vacuum dryer, drying was performed in a vacuum of 0.1 MPa at 175° C. for 2 hours. The cracking and the drying were performed in the dry room with a dew point higher than or equal to −70° C. and lower than or equal to −55° C.

In such a manner, NMC ($LiNi_{1/3}Mn_{1/3}Co_{1/3}O_2$) that is the active material with the layered rock salt structure was formed.

The formed NMC was identified as $LiNi_{1/3}Mn_{1/3}Co_{1/3}O_2$ belonging to the space group R-3m (166). Results of X-Ray Diffraction (XRD) measurement showed that the lattice constants of the a-axis and the b-axis are each 28.622 nm and the lattice constant of the c-axis is 142.352 nm. In addition, the size of a crystallite is 186.4 nm and the surface area obtained with a BET specific surface meter is 2.06 $m^2/g$.

The obtained particle size distribution of the NMC is shown in FIG. 18A. In FIG. 18A, the horizontal axis represents the particle size (μm) and the vertical axis represents the relative intensity. The thin line shows the particle size distribution of the NMC before the cracking; the thick line shows the particle size distribution of the NMC after the cracking. Through the cracking, the center of the particle size distribution is around 2 μm.

(Formation of Graphene Oxide)

Graphene oxide was formed in the following steps.

Firstly, 4 g of graphite powder (BF-40AK manufactured by Chuetsu Graphite Works Co., Ltd) was added to 138 ml of concentrated sulfuric acid (96%). Then, 18 g of potassium permanganate was slowly added to the mixture in an ice bath, and the mixture was stirred for 4.5 hours after the temperature was gradually increased to 25° C. to dissolve the potassium permanganate. Secondly, 276 ml of ultrapure water was slowly added to the obtained green solution in the ice bath at lower than or equal to 40° C. After the aqueous sulfuric acid solution was put into an oil bath at 98° C. for 15 minutes and cooled, 400 ml of ultrapure water was additionally added to the aqueous solution. Thirdly, 54 ml of a 30% hydrogen peroxide solution was added to the obtained solution to stop the reaction.

The obtained solution was subjected to filtration or centrifugation to separate the solid content thereof. The solid content was diluted with water again and washed several times. The solid content washed in such a manner was dried. Thus, a sample of graphene oxide powder, Sample GOA, was obtained.

Another sample of graphene oxide powder, Sample GOB, was obtained in a manner similar to that of Sample GOA except that 18 g of potassium permanganate was added to 4 g of graphite powder and the mixture was stirred at 25° C. for 2 hours and 35° C. for 30 minutes.

Samples GOA and GOB were analyzed by XPS. The atomic ratio O/C of each of Samples GOA and GOB was in the range of 0.50 to 0.54. In addition, Samples GOA and GOB were each heated under a nitrogen atmosphere. The temperature was increased to 300° C. at 3° C./min, and kept at 300° C. for 30 minutes. In each sample, the weight ratio of the obtained RGO to the raw graphene oxide was 50% to 55%. Although the amount of dehydration was measured with the Karl Fischer moisture meter in the heating, there was no significant difference in the maximum temperature of dehydration between Sample GOA and Sample GOB. Further, when Samples GOA and GOB were heated in a vacuum at 170° C. for 10 hours, the weight ratio of the obtained RGO to the raw graphene oxide was 55% to 65% in each sample. As for the condition of the synthesis of graphene oxide, there was no significant difference in any case. Although there was slight difference in the conductivity between the obtained RGO powders, the conditions of the synthesis of graphene oxide are not described below. Note that the same graphene oxide was used for each comparison between samples described below.

(Formation of Positive Electrode A)

With the use of the active material formed as described above, a positive electrode was formed.

NMP (produced by Tokyo Chemical Industry Co., Ltd.) which is a polar solvent was prepared as a dispersion medium. After graphene oxide was dispersed into NMP, the NMC formed as described above was added and the mixture was kneaded. PVdF as a binder was added to the mixture of the graphene oxide and the NMC, and then NMP was further added as the dispersion medium and mixed, whereby a paste was formed.

The paste formed in such a manner was applied onto 20-μm-thick aluminum foil serving as a current collector, dried in an air atmosphere at 80° C. for 40 minutes, and then dried under a reduced-pressure atmosphere at 170° C. for 10 hours; thus the graphene oxide in the paste was reduced to form graphene. In the paste, the compounding ratio of the NMC to the graphene oxide and the PVdF was 94:1:5 (weight ratio). Note that in order to remove the influence of the interface resistance between the current collector and an active material layer, a surface of the current collector was coated with an undercoat. The positive electrode formed in such a manner is referred to as Positive Electrode A. Here, the "undercoat" refers to a film formed over a current collector before applying a positive electrode paste onto the current collector for the purpose of reducing the interface resistance between an active material layer and the current collector or increasing the adhesion between the active material layer and the current collector. Note that the undercoat is not necessarily formed in a film shape, and may be formed in an island shape. For the undercoat, a carbon material can be used, for example. Examples of the carbon material are graphite, carbon black such as acetylene black or ketjen black, and carbon nanotubes.

(Observation of Positive Electrode A)

A cross-section of the active material layer of Positive Electrode A, which was formed as described above and in which graphene oxide was used as the raw material of graphene, was observed with a scanning electron microscope (SEM). FIGS. 11A and 11B and FIGS. 12A and 12B show observation results.

Figure 11A:
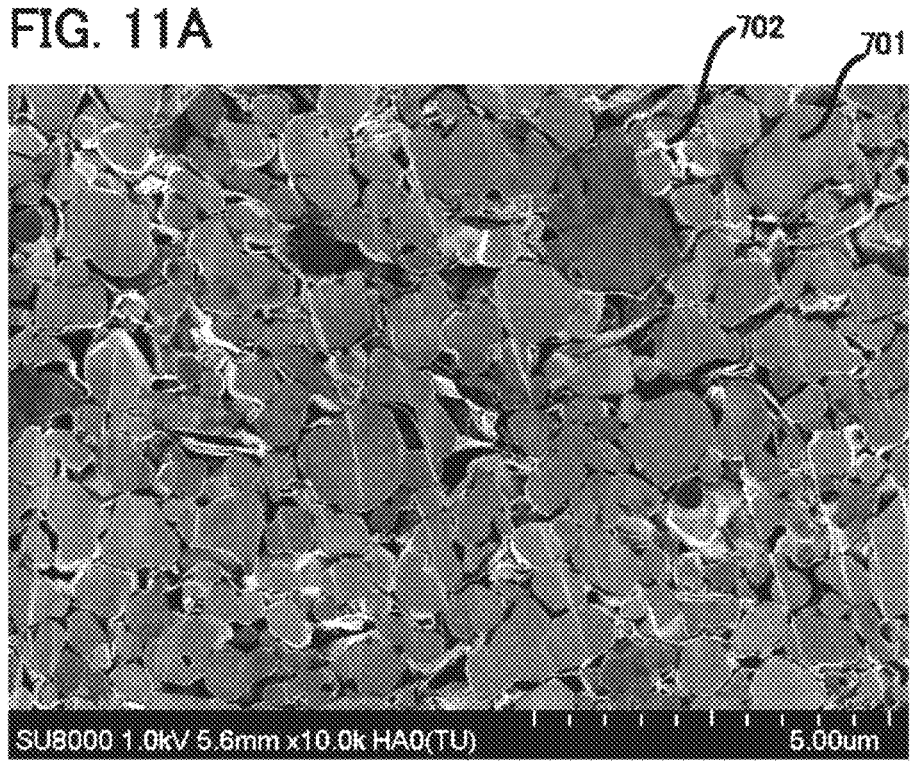
FIGS. 11A and 11B are SEM images of a positive electrode active material layer.
Figure 12A:
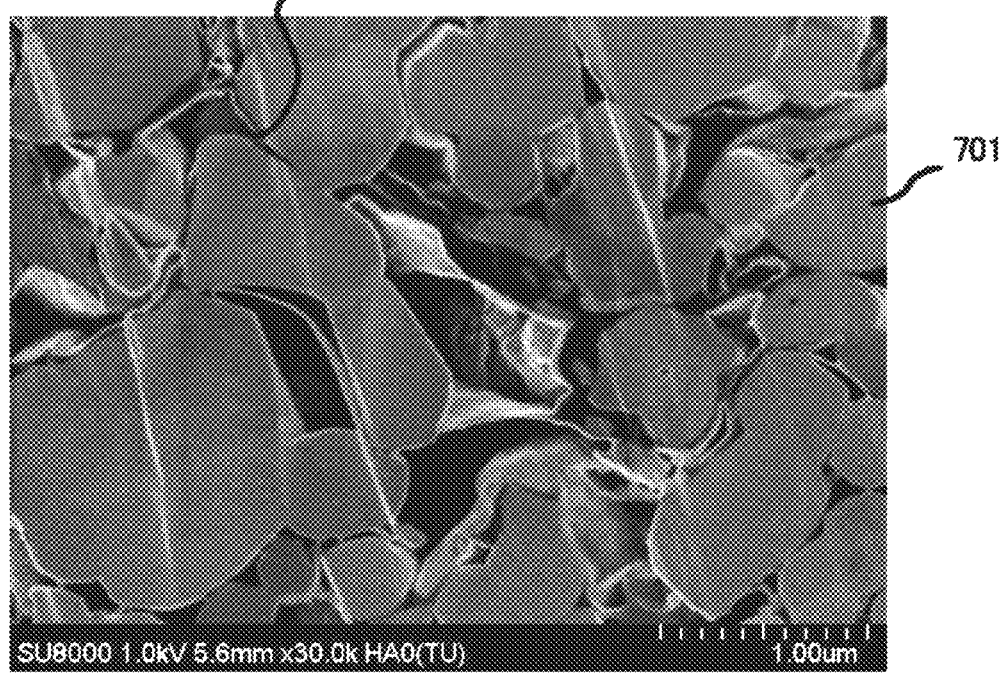
FIGS. 12A and 12B are SEM images of a positive electrode active material layer.
Figure 12B:
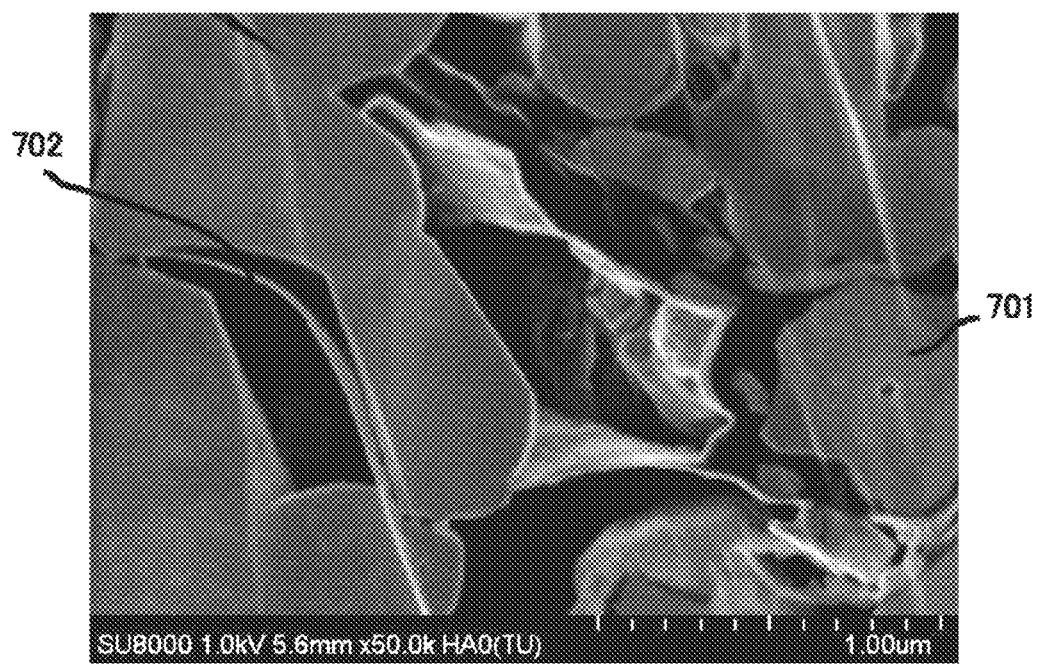

In FIG. 11A and FIGS. 12A and 12B, which are enlarged views of FIG. 11A, a plurality of NMC particles 701 that are the active material are observed in the active material layer of Positive Electrode A. The NMC particles 701 observed in the SEM images have a diameter of approximately 0.2 μm to 2.0 μm. Here, white thread-like or string-like portions correspond to graphene 702. The graphene 702 can be seen like a thread or a string in a gap (void) between the plurality of particles of the active material and also adheres to surfaces of the particles of the active material.

Figure 11B:
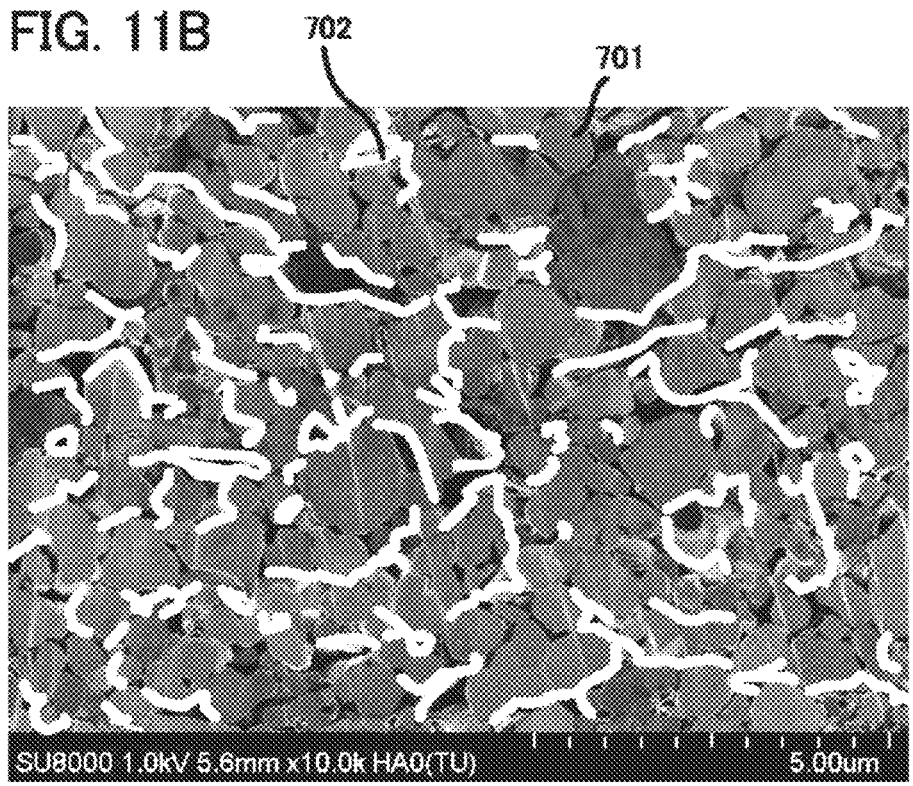

Some of the graphene 702 in the SEM image in FIG. 11A are highlighted by the thick white lines in FIG. 11B. The graphene 702 is in surface contact with the NMC particle 701 so as to surround a surface of the NMC particle 701. In addition, the graphene 702 is in contact with the plurality of NMC particles 701 so as to connect the plurality of NMC particles 701 to each other. FIGS. 11A and 11B show that the graphene 702 is almost uniformly and three-dimensionally dispersed into the active material layer. The graphene 702 is in surface contact with the plurality of NMC particles 701 and also pieces of the graphene 702 are in surface contact with each other, which indicates that the pieces of the graphene are connected to each other to form a network for electron conduction in the active material layer.

(Measurement of Characteristics of Battery Using Positive Electrode A)

Positive Electrode A, which was formed as described above and in which graphene oxide was used as the raw material of graphene, was provided in a half cell to measure charge and discharge characteristics thereof. When the characteristics were measured, a CR2032 coin-cell battery (with a diameter of 20 mm and a height of 3.2 mm) was used as a cell. Lithium foil was used as a negative electrode and 25-μm-thick polypropylene (PP) was used as a separator. An electrolyte solution to be used was formed in such a manner that lithium hexafluorophosphate ($LiPF_6$) was dissolved at a concentration of 1 mol/L in a solution in which ethylene carbonate (EC) and diethyl carbonate (DEC) were mixed in a volume ratio of 1:1. In charging, CCCV charging at 0.2 C was performed; the upper limit voltage was 4.5 V and the lower limit current at constant voltage was 0.01 C. In discharging, CC discharging at 0.2 C was performed. The measurement was conducted at a room temperature (25° C.).

Figure 14:
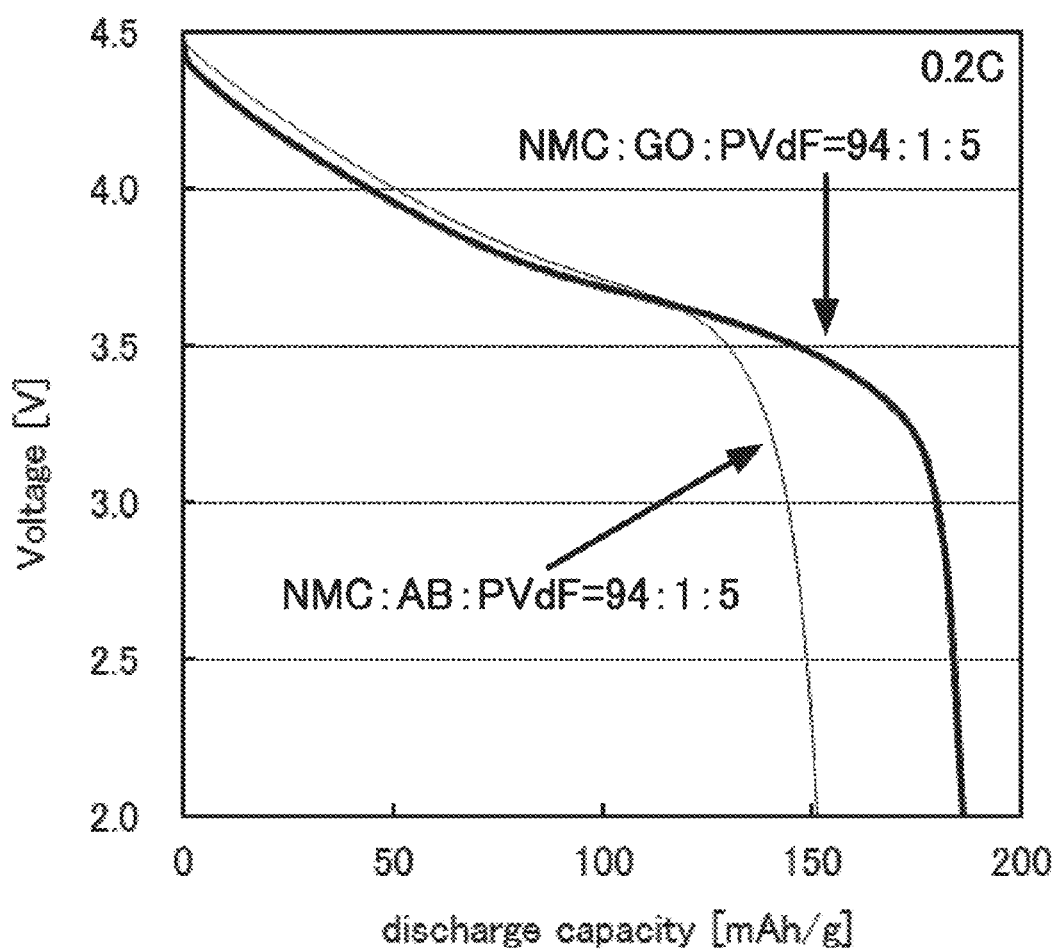
FIG. 14 is a graph showing discharge characteristics.

FIG. 14 shows discharge characteristics. The horizontal axis represents discharge capacity (mAh/g) and the vertical axis represents voltage (V). The thick line is a curve showing the charge and discharge characteristics of the cell including Positive Electrode A in which graphene oxide was used as the raw material of graphene. As described above, the compounding ratio of the active material (NMC) to the graphene oxide and the binder (PVdF) was 94:1:5 (wt %). The active material layer had a thickness of 69 μm, and a density of 3.1 g/cm$^3$.

For comparison, the thin line shows the charge and discharge characteristics of a cell including a conventional positive electrode (hereinafter referred to as Positive Electrode X) in which acetylene black (AB) was used as a conductive additive instead of graphene. The compounding ratio of an active material (NMC) to the AB and a binder (PVdF) was 94:1:5 (wt %), which is the same as that in the active material layer of Positive Electrode A. An active material layer had a thickness of 70 μm and a density of 3.2 g/cm$^3$. As the AB, a powdery product of DENKI KAGAKU KOGYO KABUSHIKI KAISHA was used. The specific surface area was 68 m$^2$/g and the average particle diameter was 35 nm.

The measurement results in FIG. 14 shows that the cell including Positive Electrode X in which the AB was used as the conductive additive in the active material layer has a discharge capacity of approximately 150 mAh/g, whereas the cell including Positive Electrode A in which graphene oxide was used as the raw material of graphene in the active material layer has a discharge capacity of approximately 180 mAh/g. This suggests that discharge capacity is dramatically increased when graphene oxide is used as a raw material of graphene in an active material layer.

When graphene oxide is used as a raw material of graphene in an active material layer, a plurality of particles of an active material are in contact with each other owing to a high dispersion property of graphene oxide, and also pieces of graphene are in contact with each other to form a three-dimensional path for electron conduction. For this reason, it is probable that most of the particles of the active material contribute to formation of charge and discharge capacity.

Figure 13A:
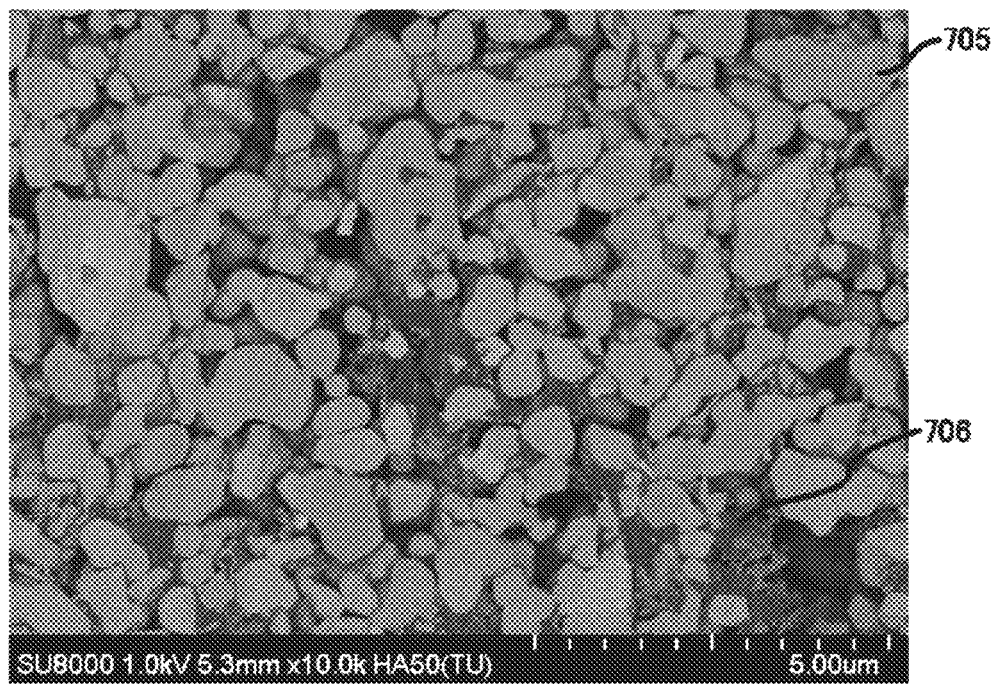
FIGS. 13A and 13B are SEM images of a positive electrode active material layer.

Here, FIG. 13A shows a SEM image of a cross-section of the active material layer in Positive Electrode X using the AB. In the SEM image, a plurality of NMC particles 705 and AB 706 which is localized to fill gaps between the NMC particles 705 are observed.

Figure 13B:
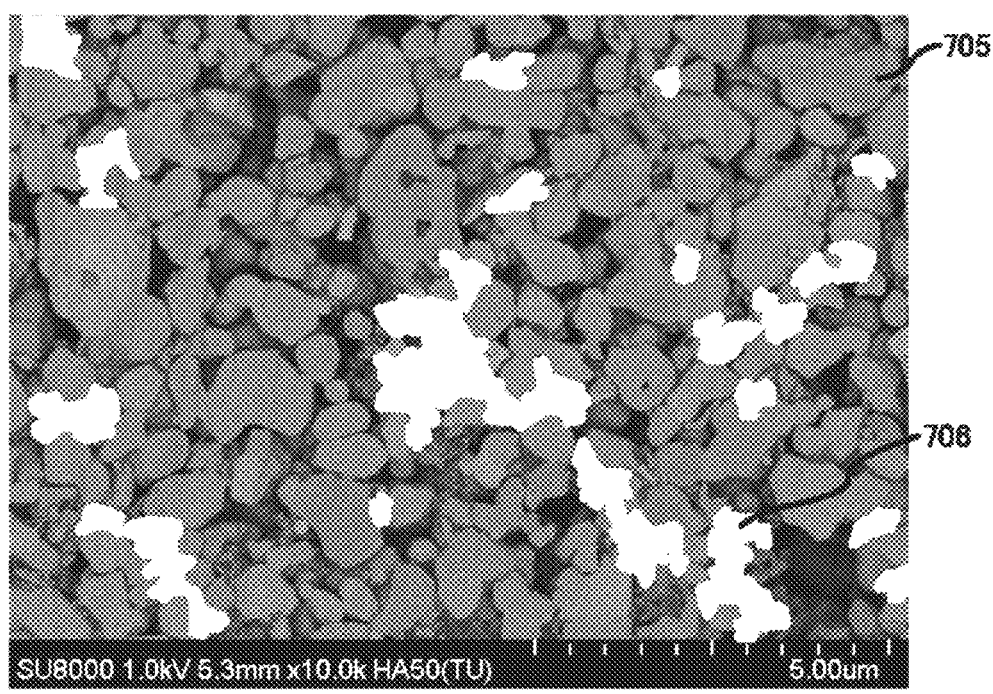

In FIG. 13B, part of the AB 706 is highlighted as a white region. The AB 706 is not provided uniformly in the active material layer, and is partly aggregated.

This indicates that the AB 706 has a low dispersion property in the active material layer. Thus, it is probable that the NMC particles 705 in a region where the ratio of the AB 706 is low cannot contribute to formation of battery capacity.

Example 2

In this example, lithium cobalt oxide ($LiCoO_2$) that is one of examples of the active material having the layered rock salt structure was used as an active material to form the positive electrode for a nonaqueous secondary battery of one embodiment of the present invention. Note that the present invention is not limited to this example.

(Formation of Active Material (Lithium Cobalt Oxide))

In this example, as the active material, lithium cobalt oxide ($LiCoO_2$) having the layered rock salt structure was formed. $Li_2CO_3$ and $Co_3O_4$ were used as raw materials to form lithium cobalt oxide and weighed to satisfy the composition, Li: Co=1:1.

Next, the raw materials were mixed and crushed with a ball mill. With the use of a 50 ml zirconia pot and 20 g of zirconia balls with a diameter of 3 mm, the raw materials with a total weight of 10 g were subjected to ball milling at a rotation speed of 400 rpm for 2 hours. In the mixing and crushing, 25 ml acetone was used as a solvent.

Next, predrying was performed with a hot plate. The predrying was performed in the air at 50° C. for 1 hour to 2 hours with an air flow of 0.5 m/s wind velocity.

Next, with the use of a muffle furnace, baking was performed in an air atmosphere at 950° C. for 5 hours. A temperature rising rate of the muffle furnace was 230° C./h. Then, aggregated particles of the active material were cracked with the use of a zirconia mortar and a stainless steel sieve.

Lastly, with the use of the vacuum dryer, drying was performed in a vacuum of 0.1 MPa at 175° C. for 2 hours.

The drying was performed in a dry room with a dew point higher than or equal to −70° C. and lower than or equal to −55° C.

In such a manner, lithium cobalt oxide that is the active material with the layered rock salt structure was formed.

The formed lithium cobalt oxide was identified as $LiCoO_2$ belonging to the space group R-3m (166). Results of XRD measurement showed that the lattice constants of the a-axis and the b-axis are each 28.157 nm and the lattice constant of the c-axis is 140.493 nm. In addition, the size of a crystallite is 412.2 nm and the surface area obtained with a BET specific surface meter is 1.4 $m^2/g$.

The particle size distribution of the lithium cobalt oxide is shown in FIG. 18B. In FIG. 18B, the horizontal axis represents the particle size (μm) and the vertical axis represents the relative intensity. The thin line shows the particle size distribution of the lithium cobalt oxide before the cracking; the thick line shows the particle size distribution of the lithium cobalt oxide after the cracking. Through the cracking, the center of the particle size distribution is around 3 μm.

(Formation of Positive Electrode B)

With the use of the active material formed as described above, a positive electrode was formed.

NMP (produced by Tokyo Chemical Industry Co., Ltd.) which is a polar solvent was prepared as a dispersion medium. After graphene oxide was dispersed into NMP, the lithium cobalt oxide formed as described above was added and the mixture was kneaded. PVdF as a binder was added to the mixture of the graphene oxide and the lithium cobalt oxide, and then NMP was further added as the dispersion medium and mixed, whereby a paste was formed.

The paste formed in such a manner was applied onto 20-μm-thick aluminum foil serving as a current collector, dried in an air atmosphere at 80° C. for 40 minutes, and then dried under a reduced-pressure atmosphere at 170° C. for 10 hours; thus the graphene oxide in the paste was reduced to form graphene. In the paste, the compounding ratio of the lithium cobalt oxide to the graphene oxide and the PVdF was 94:1:5 (wt %). Note that to remove the influence of the interface resistance between the current collector and an active material layer, a surface of the current collector was coated with an undercoat. The positive electrode formed in such a manner is referred to as Positive Electrode B.

(Observation of Positive Electrode B)

A cross-section of the active material layer of Positive Electrode B, which was formed as described above and in which graphene oxide was used as the raw material of graphene, was observed with a SEM. FIGS. 15A and 15B and FIGS. 16A and 16B show observation results.

Figure 15A:
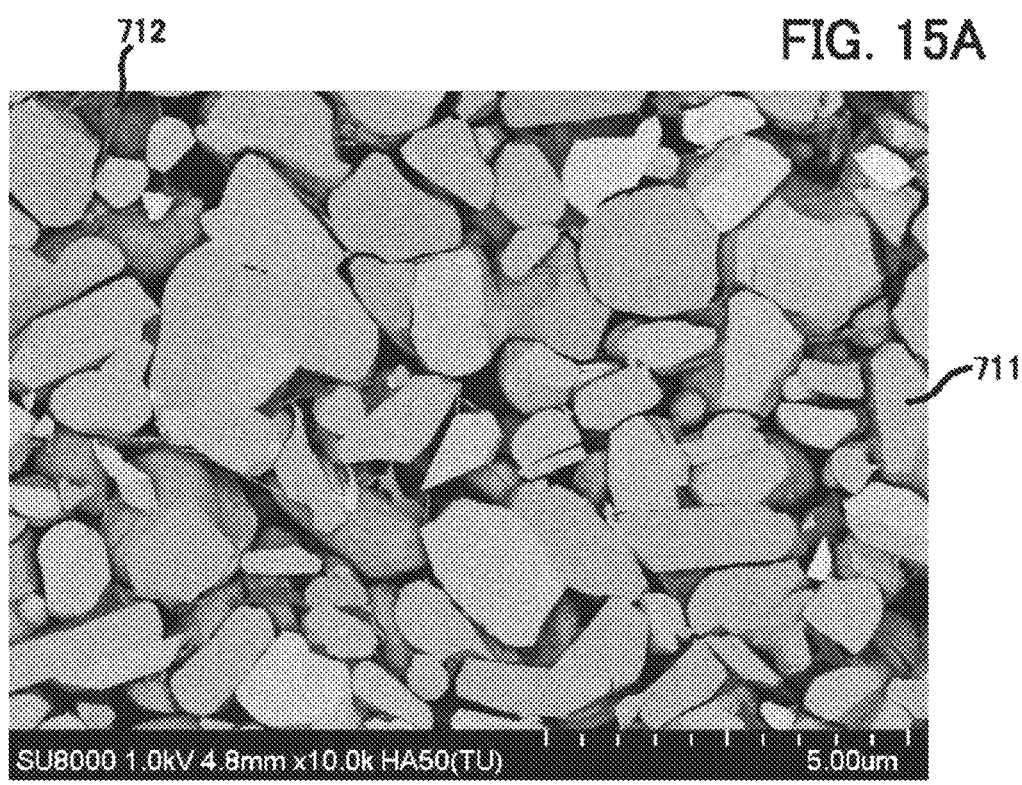
FIGS. 15A and 15B are SEM images of a positive electrode active material layer.
Figure 16A:
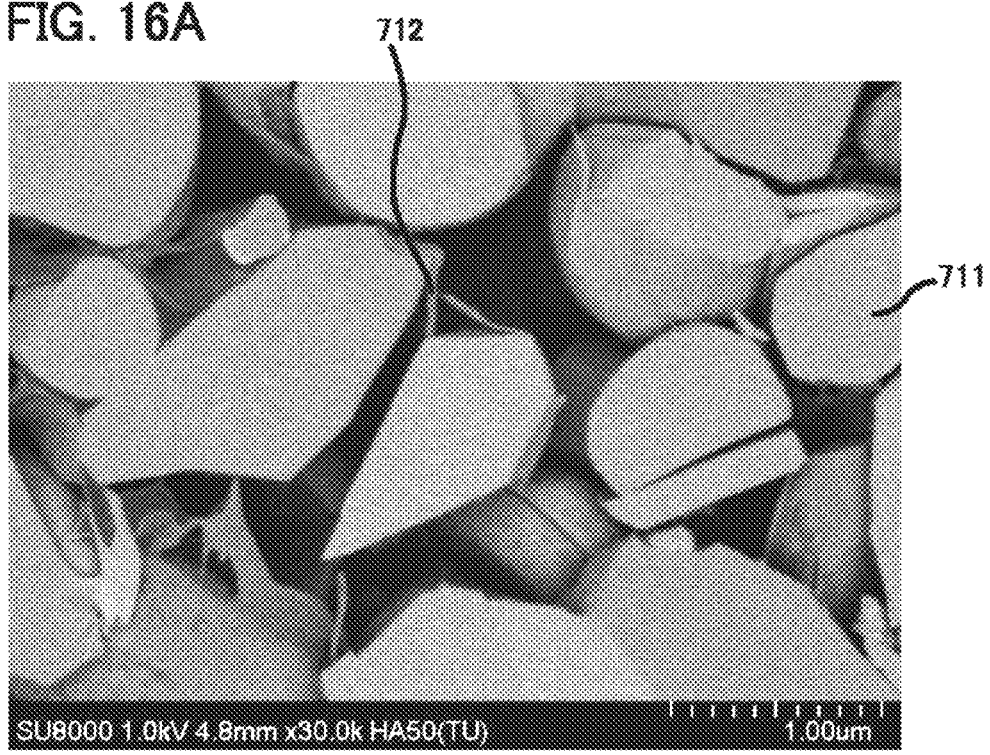
FIGS. 16A and 16B are SEM images of a positive electrode active material layer.
Figure 16B:
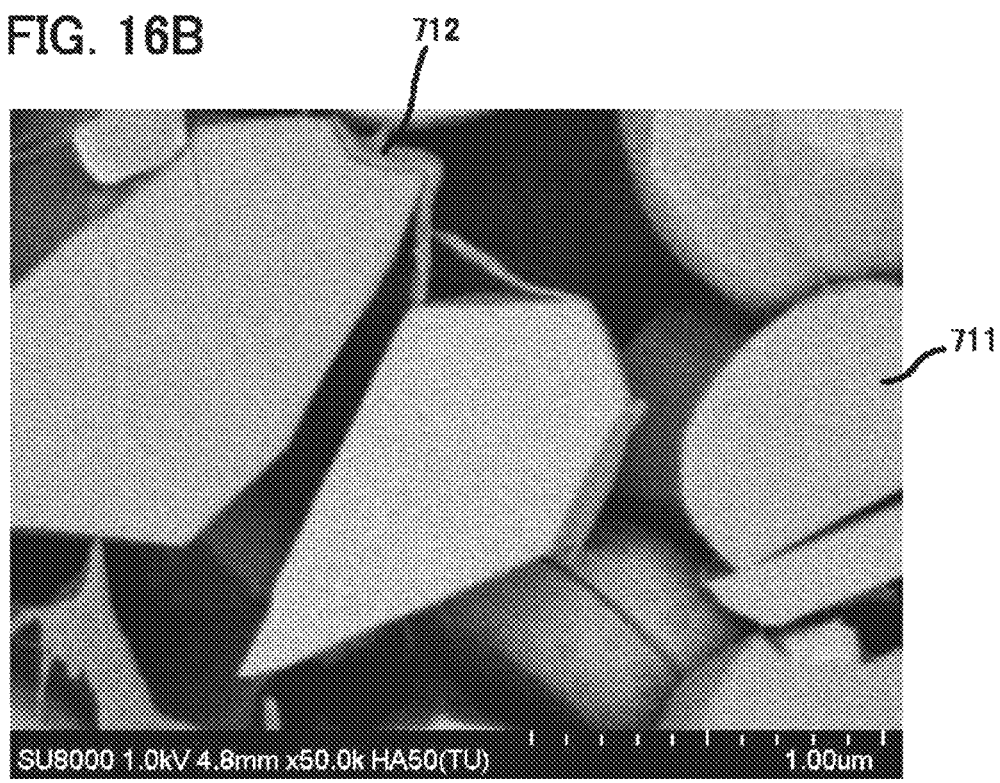

In FIG. 15A and FIGS. 16A and 16B, which are enlarged views of FIG. 15A, a plurality of lithium cobalt oxide particles 711 that are the active material are observed in the active material layer of Positive Electrode B. The lithium cobalt oxide particles 711 observed in the SEM images have a diameter of approximately 0.2 μm to 3.0 μm. Here, white thread-like or string-like portions correspond to graphene 712. The graphene 712 can be seen like a thread or a string in a gap (void) between the plurality of particles of the active material and also adheres to surfaces of the particles of the active material.

Figure 15B:
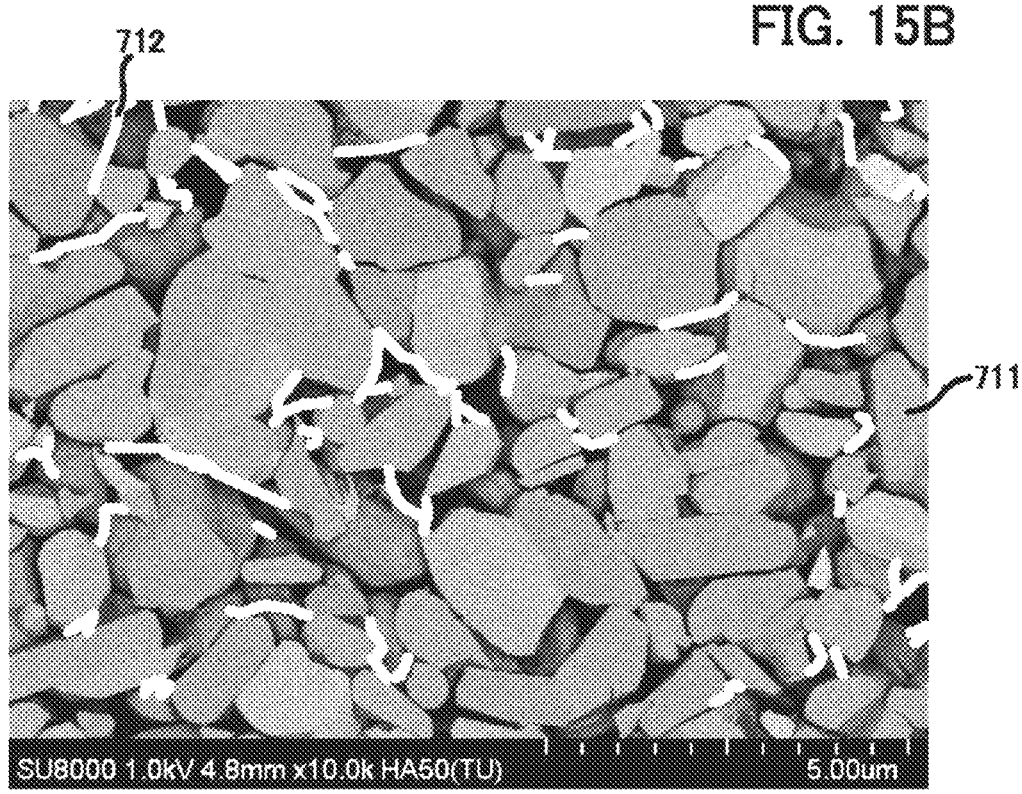

Some of the graphene 712 in the SEM image in FIG. 15A are highlighted by the thick white lines in FIG. 15B. The graphene 712 is in surface contact with a surface of the lithium cobalt oxide particle 711. In particular, crystal growth is encouraged in the surface of the lithium cobalt oxide particle 711, and thus the lithium cobalt oxide particle 711 is large in size; therefore, the whole of the lithium cobalt oxide particle 711 has an angular shape and high proportion of flat regions. Accordingly, a flat plane of the lithium cobalt oxide particle 711 is in surface contact with the graphene 712. In addition, the graphene 712 is in contact with the plurality of lithium cobalt oxide particles 711 so as to connect the plurality of lithium cobalt oxide particles 711. FIGS. 15A and 15B show that the graphene 712 is almost uniformly and three-dimensionally dispersed into the active material layer. The graphene 712 is in surface contact with the plurality of lithium cobalt oxide particles 711 and also pieces of the graphene 712 are in surface contact with each other, which indicates that the pieces of the graphene are connected to each other to form a network for electron conduction in the active material layer.

(Measurement of Characteristics of Battery Using Positive Electrode B)

Positive Electrode B, which was formed as described above and in which graphene oxide was used as the raw material of graphene, was provided in a half cell to measure charge and discharge characteristics thereof in a manner similar to that of Positive Electrode A.

When the characteristics were measured, a CR2032 coin-cell battery (with a diameter of 20 mm and a height of 3.2 mm) was used as a cell. Lithium foil was used as a negative electrode and 25-μm-thick polypropylene (PP) was used as a separator. An electrolyte solution to be used was formed in such a manner that lithium hexafluorophosphate ($LiPF_6$) was dissolved at a concentration of 1 mol/L in a solution in which ethylene carbonate (EC) and diethyl carbonate (DEC) were mixed in a volume ratio of 1:1. In charging, CCCV charging at 0.2 C was performed; the upper limit voltage was 4.2 V and the lower limit current at constant voltage was 0.01 C. At this time, the charging was finished at 160 mAh/g. In discharging, CC discharging at 0.2 C, 1 C, 2 C, and 5C was performed. The measurement was conducted at a room temperature (25° C.).

Figure 17:
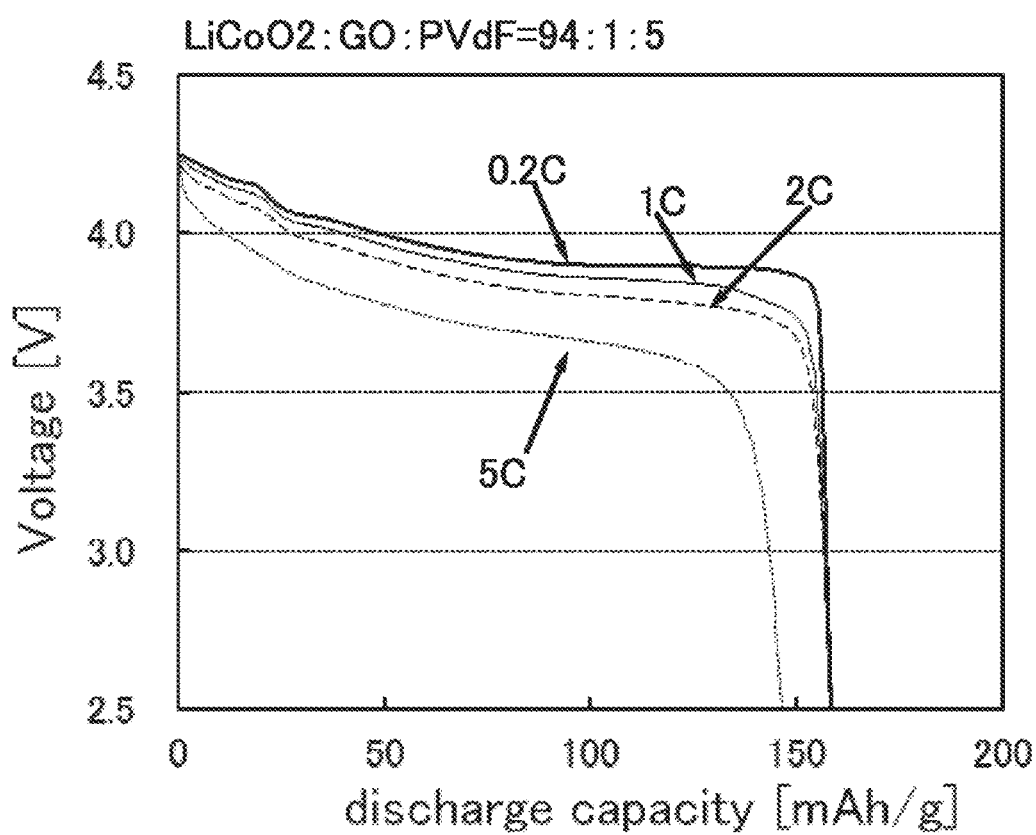
FIG. 17 is a graph showing discharge characteristics.

FIG. 17 shows discharge characteristics. The horizontal axis represents discharge capacity (mAh/g) and the vertical axis represents voltage (V). The curves in FIG. 17 are discharge curves showing results at 0.2 C, 1 C, 2 C, and 5 C in this order from the top. As described above, the compounding ratio of the active material (lithium cobalt oxide) to the graphene oxide and the binder (PVdF) was 94:1:5 (wt %). The electrode had a thickness of 26 μm and a density of 2.9 $g/cm^3$.

The measurement results in FIG. 17 shows that sufficient discharge characteristics can be obtained even when lithium cobalt oxide is used as an active material. The discharge capacity is 160 mAh/g in each of the results at 0.2 C, 1 C, and 2 C because the charging was finished at a discharge capacity of 160 mAh/g.

As a comparative example, an example of using $LiFePO_4$ as an active material is described. $LiFePO_4$ was synthesized by a solid phase method with the use of $Li_2CO_3$, $FeC_2O_4$, and $NH_4H_2PO_4$ as raw materials. Prebaking was performed at 350° C. and baking was performed at 600° C. The obtained sample is called N—LiFePO4. In addition, another sample called C—LiFePO4 was formed in the condition similar to that of N—LiFePO4 except that 10 wt % glucose was added before the baking at 600° C.

N—LiFePO4 was used to form comparative samples of a positive electrode in the following manner. $LiFePO_4$, graphene oxide, and PVdF were mixed in a weight ratio of 93:2:5 to form slurry, and then the slurry was applied to aluminum foil; thus, Comparative Sample PEA was formed. $LiFePO_4$, graphene (AO-1 manufactured by Graphene Supermarket), and PVdF were mixed in a weight ratio of 90:5:5 to form slurry, and then the slurry was applied to aluminum foil; thus, Comparative Sample PEB was formed. LiFePO$_4$, acetylene black (manufactured by DENKI KAGAKU KOGYOU KABUSHIKI KAISHA; specific surface area of 68 m$^2$/g), and PVdF were mixed in a weight ratio of 80:15:5 to form slurry, and then the slurry was applied to aluminum foil; thus, Comparative Sample PEC was formed. C—LiFePO4 was used to form a comparative sample of the positive electrode in the following manner. LiFePO$_4$, graphene oxide, and PVdF were mixed in a weight ratio of 85:8:7 to form slurry and then, the slurry was applied to aluminum foil; thus, Comparative Sample PED was formed. Note that NMP was used as a dispersion medium in each comparative sample.

Comparative Sample PEA had a thickness of 30 μm and a density of 2.6 g/cm$^3$ as an active material layer. Comparative Sample PEB had a thickness of 43 μm and a density of 1.5 g/cm$^3$. Comparative Sample PEC had a thickness of 23 μm and a density of 1.4 g/cm$^3$. Comparative Sample PED had a thickness of 66 μm and a density of 1.7 g/cm$^3$.

The comparative samples were each provided in a half cell to measure charge and discharge characteristics thereof. The characteristics were measured with the use of a CR2032 coin-cell battery (with a diameter of 20 mm and a height of 3.2 mm) as a cell. Lithium foil was used as a negative electrode and 25-μm-thick polypropylene (PP) was used as a separator. An electrolyte solution to be used was formed in such a manner that lithium hexafluorophosphate (LiPF$_6$) was dissolved at a concentration of 1 mol/L in a solution in which ethylene carbonate (EC) and diethyl carbonate (DEC) were mixed in a volume ratio of 1:1. In charging, CCCV charging at 0.2 C was performed; the upper limit voltage was 4.3 V and the lower limit current at constant voltage was 0.01 C. In discharging, CC discharging at 0.2 C or 1 C was performed; the lower limit voltage was 2.0 V. The measurement was conducted at a room temperature (25° C.). Further, capacity per weight of the positive electrode active material, which is obtained from the compounding ratio, is represented.

Comparative Sample PEA had a discharge capacity of 159 mAh/g at 0.2 C; Comparative Sample PEB, 152 mAh/g; Comparative Sample PEC, 129 mAh/g; and Comparative Sample PED, 155 mAh/g. Comparative Sample PEA had a discharge capacity of 148 mAh/g at 1 C; Comparative Sample PEB, 136 mAh/g; Comparative Sample PEC, 106 mAh/g; and Comparative Sample PED, 145 mAh/g.

Comparative Sample PED had capacity close to the theoretical capacity of LiFePO$_4$, 170 mAh/g. In Comparative Sample PEA, only RGO serves as a conductive additive. Although 2 wt % graphene oxide was used as a raw material of the RGO in Comparative Sample PEA, the RGO served well as the conductive additive. In addition, Comparative Sample PEA had capacity equivalent to that of Comparative Sample PED. Comparative Sample PEB containing 5 wt % graphene had capacity a little lower than that of Comparative Sample PED at 1 C. Comparative Sample PEC containing 15 wt % acetylene black had discharge capacity extremely lower than that of Comparative Sample PED at 0.2 C.

The above-described results reveal that, when graphene oxide is used as a raw material of graphene included in an active material layer, a dispersion property in a polar solvent is high because of functional groups of the graphene oxide, which enables the graphene formed by reduction to be highly dispersed into the active material layer. This demonstrates that graphene can form a network for electron conduction in an active material layer, whereby a positive electrode with high electron conductivity can be formed.

This application is based on Japanese Patent Application serial No. 2012-245467 filed with Japan Patent Office on Nov. 7, 2012, the entire contents of which are hereby incorporated by reference.

What is claimed is:

1. A positive electrode comprising:
   a current collector; and
   an active material layer over the current collector, the active material layer comprising:
      a plurality of particles of an active material having a layered rock salt structure; and
      a piece of graphene,
   wherein a ratio of the oxygen in the piece of graphene is higher than or equal to 2 atomic % and lower than or equal to 20 atomic %, and
   wherein the piece of graphene is in surface contact with at least one of the plurality of particles of the active material.

2. The positive electrode according to claim 1, wherein the active material comprises lithium and a metal selected from nickel, manganese, and cobalt.

3. The positive electrode according to claim 1, wherein the active material is selected from LiCoO$_2$, LiNiO$_2$, LiMnO$_2$, Li$_2$MnO$_3$, LiNi$_x$Co$_{1-x}$O$_2$ (0<x<1), LiNi$_x$Mn$_{1-x}$O$_2$ (0<x<1), and LiNi$_x$Mn$_y$Co$_{1-x-y}$O$_2$ (x>0, y>0, x+y<1).

4. The positive electrode according to claim 1, wherein the active material has an average particle diameter of greater than or equal to 1 μm and less than or equal to 50 μm.

5. The positive electrode according to claim 1, wherein a length of one side of the piece of the graphene is greater than or equal to 50 nm and less than or equal to 100 μm.

6. The positive electrode according to claim 1, wherein the piece of the graphene is a single layer or a multilayer including more than or equal to 2 layers and less than or equal to 100 layers.

7. The positive electrode according to claim 1, wherein a weight ratio of the graphene to the active material layer is less than 5.3 wt %.

8. A nonaqueous secondary battery comprising the positive electrode according to claim 1.

9. An electrical device comprising the nonaqueous secondary battery according to claim 8.

10. A positive electrode comprising:
   a current collector; and
   a positive electrode active material layer over the current collector, the positive electrode active material layer comprising:
      a plurality of particles of an active material;
      a piece of graphene,
   wherein a ratio of the oxygen in the piece of graphene is higher than or equal to 2 atomic % and lower than or equal to 20 atomic %, and
   wherein the piece of graphene is in surface contact with one of the plurality of particles, and
   wherein the active material is selected from lithium cobalt oxide, lithium manganese oxide, lithium nickel oxide, and a complex of any of the lithium cobalt oxide, the lithium manganese oxide, and the lithium nickel oxide.

11. The positive electrode according to claim 10, wherein the active material has an average particle diameter of greater than or equal to 1 μm and less than or equal to 50 μm.

12. The positive electrode according to claim 10, wherein a length of one side of the piece of the graphene is greater than or equal to 50 nm and less than or equal to 100 μm.

13. The positive electrode according to claim 10, wherein the piece of the graphene is a single layer or a multilayer including more than or equal to 2 layers and less than or equal to 100 layers.

14. A nonaqueous secondary battery comprising the positive electrode according to claim 10.

15. An electrical device comprising the nonaqueous secondary battery according to claim 14.

16. A method for forming a positive electrode, comprising the steps of:
   forming a dispersion liquid comprising a piece of graphene oxide;
   forming a mixture by mixing an active material particle having a layered rock salt structure with the dispersion liquid so that the piece of graphene oxide is in surface contact with the active material particle; and
   reducing the piece of graphene oxide,
   wherein a ratio of the oxygen in the piece of graphene is higher than or equal to 2 atomic % and lower than or equal to 20 atomic %.

17. The method for forming a positive electrode according to claim 16, further comprising the steps of:
   forming a paste by mixing a binder with the mixture after forming the mixture;
   applying the paste to a current collector to form an active material layer; and
   drying the paste.

18. The method for forming a positive electrode according to claim 16, wherein the piece of the graphene oxide is a single layer or a multilayer including more than or equal to 2 layers and less than or equal to 100 layers.

19. The positive electrode according to claim 1, wherein the active material layer further comprises a binder.

20. The positive electrode according to claim 10, wherein the active material layer further comprises a binder.

* * * * *